(12) United States Patent
Sakamoto

(10) Patent No.: US 8,345,761 B2
(45) Date of Patent: Jan. 1, 2013

(54) MOTION VECTOR DETECTION APPARATUS AND MOTION VECTOR DETECTION METHOD

(75) Inventor: Daisuke Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1348 days.

(21) Appl. No.: 11/828,517

(22) Filed: Jul. 26, 2007

(65) Prior Publication Data

US 2008/0036916 A1    Feb. 14, 2008

(30) Foreign Application Priority Data

Aug. 8, 2006  (JP) ................. 2006-215966
Jun. 26, 2007  (JP) ................. 2007-167461

(51) Int. Cl.
*H04N 5/14* (2006.01)

(52) U.S. Cl. .............. 375/240.16; 348/699; 348/700; 348/701; 375/240.17

(58) Field of Classification Search .......... 348/699, 348/700, 701; 375/240.16–17
See application file for complete search history.

(56) References Cited

U.S. PATENT DOCUMENTS 6,091,460 A * 7/2000 Hatano et al. ............. 348/699
6,765,965 B1   7/2004 Hanami et al.
2004/0120400 A1 * 6/2004 Linzer ................. 375/240.16
2007/0098073 A1   5/2007 Maeda
2007/0268960 A1 * 11/2007 Jia ......................... 375/147

FOREIGN PATENT DOCUMENTS

JP  2003-143609 A   5/2003
JP  2005-184694 A1  7/2005

* cited by examiner

*Primary Examiner* — Jung Kim
*Assistant Examiner* — Ayoub Alata
(74) *Attorney, Agent, or Firm* — Canon USA Inc. IP Division

(57) ABSTRACT

A motion vector detection apparatus is configured to calculate a temporal distance between a frame to be coded and each of a plurality of reference candidate frames referred to by the frame to be coded. The motion vector detection apparatus searches for a candidate motion vector between the frame to be coded and each the plurality of reference candidate frames and detects a motion vector for the frame to be coded from the candidate motion vectors. In searching for and detecting a candidate motion vector, the motion vector detection apparatus changes an amount of the calculation performed during the detection of a candidate motion vector according to the calculated temporal distance between the frame to be coded and the reference candidate frame, and a coding type of the reference candidate frame.

17 Claims, 14 Drawing Sheets

MOTION VECTOR DETECTION APPARATUS AND MOTION VECTOR DETECTION METHOD

BACKGROUND OF THE INVENTION

1. Field of the Invention

The present invention relates to a motion vector detection apparatus and a motion vector detection method, and more specifically, the present invention relates to a method for detecting a motion vector between pictures.

2. Description of the Related Art

In recent years, digitized information is widely used in multimedia products. Together with the widespread use of digitized information, a high quality image is desired in the field of video broadcasting. For example, broadcasting media is now shifting from a conventional standard definition (SD) system of 720×480 pixels to a high definition (HD) system of 1,920×1,080 pixels.

As the demand for a high quality image grows in video broadcasting, an amount of digital data is increasing. Accordingly, compression-coding and decoding are required which are more advanced than a conventional method.

To deal with such requirement, International Telecommunication Union Telecommunication Standardization Sector Study Group 16 (ITU-T SG16) and International Organization for Standardization/International Electro-technical Commission, Joint Technical Committee 1/Sub Committee 29/Working Group 11 (ISO/IEC JTC1/SC29/WG11) have been working to standardize coding methods using interpicture prediction, which utilizes the correlation between pictures. Now, H.264/Moving Picture Experts Group-4 Part 10 Advanced Video Coding (H.264/MPEG-4 PART10 (AVC)), among various coding methods, can compress data at highest efficiency. Hereinafter, the H.264/MPEG-4 PART10 (AVC) is simply referred to as "H.264."

In the case of H.264, the degree of freedom when a user selects a reference picture for detecting a motion vector, becomes relatively higher than in a conventional method. H.264 detects a motion vector by dividing a picture to be coded into the unit of a macroblock or in a smaller unit. Thus, H.264 enables detection of a moving vector in a unit smaller than a conventional method. Accordingly, H.264 can reduce the amount of codes generated in the compression-coding processing.

Japanese Patent Application Laid-Open NO. 2005-184694 discusses a method using H.264, in which a plurality of frame memories are provided and a user can select a reference picture to be used in coding of a picture to be coded from among a plurality of pictures stored in the frame memories.

Conventional coding methods, such as MPEG-1, MPEG-2, and MPEG-4 have a forward prediction function for predicting a following picture according to a previous picture and a backward prediction function for predicting a previous picture according to a following picture.

Here, "predicting a previous picture according to a following picture" refers to prediction of a picture on which coding processing has not been performed, according to a current picture. In the following description, the conventional coding methods, namely, MPEG-1, MPEG-2, and MPEG-4, are collectively referred to as an "MPEG coding method."

Inmost cases, a picture closer in terms of time, shows relatively higher correlation with the picture to be coded. Therefore, in forward prediction and backward prediction according to the MPEG coding method, an "I picture" or a "P picture," which exists close to a picture to be coded, are generally used as a reference picture.

However, in the case of a video camera having an MPEG-compliant coder-decoder (codec), it is possible that considerable change occurs between pictures if the video camera is quickly moved during panning and tilting at the time of shooting a moving image, or if a picture is shot immediately after a cut change.

In such a case, even temporally close pictures cannot have a high correlation with each other. Accordingly, it is not useful to utilize motion compensation prediction in such a case.

In order to address this problem, H.264 employs an advanced prediction method. H.264 performs prediction coding on a temporally distant picture as well as on a close picture. If it is expected that coding efficiency can be improved with a temporally distant picture compared to a close picture, H.264 uses the temporally distant picture as a reference picture.

As described above, according to H.264, a user can freely select as reference an input picture that is least different from a coded picture, even if the video camera shooting a moving image is moved quickly or after a cut change has been inserted. Thus, motion compensation prediction can be performed with a high accuracy.

However, if calculation for selecting a picture that is least different from an input picture is performed on all coded pictures, an amount of calculation increases in proportion to the number of reference candidate pictures. Thus, it takes a long time in coding a picture.

Furthermore, in the case of a mobile apparatus such as a video camera, consumption of a battery increases as the calculation load increases. Consequently, time duration in which a picture can be taken becomes short.

SUMMARY OF THE INVENTION

The present invention is directed to an apparatus and a method for preventing an increase in an amount of calculation performed in the course of detecting a motion vector while improving the accuracy in detection of a motion vector.

According to an aspect of the present invention, a motion vector detection apparatus includes: a calculation unit configured to calculate a temporal distance between a frame to be coded and each of a plurality of reference candidate frames referred to by the frame to be coded; and a motion vector detection unit configured to search for a candidate motion vector between the frame to be coded and each of the plurality of reference candidate frames and detect a motion vector for the frame to be coded from the candidate motion vectors. In the motion vector detection apparatus, when a candidate motion vector is searched for between the frame to be coded and the reference candidate frame, an amount of the calculation performed by the motion vector detection unit is changed according to the temporal distance between the frame to be coded and the reference candidate frame, which is calculated by the calculation unit, and a coding type of the reference candidate frame.

According to another aspect of the present invention, a method for detecting a motion vector includes: calculating a temporal distance between a frame to be coded and each of a plurality of reference candidate frames referred to by the frame to be coded; and searching for a candidate motion vector between the frame to be coded and each of the plurality of reference candidate frames and detecting a motion vector for the frame to be coded from the candidate motion vectors. In the method for detecting a motion vector, when a candidate motion vector is searched for between the frame to be coded and the reference candidate frame, an amount of the calculation performed during the detection of the candidate motion vector is changed according to the calculated temporal distance between the frame to be coded and the reference candidate frame, and a coding type of the reference candidate frame.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
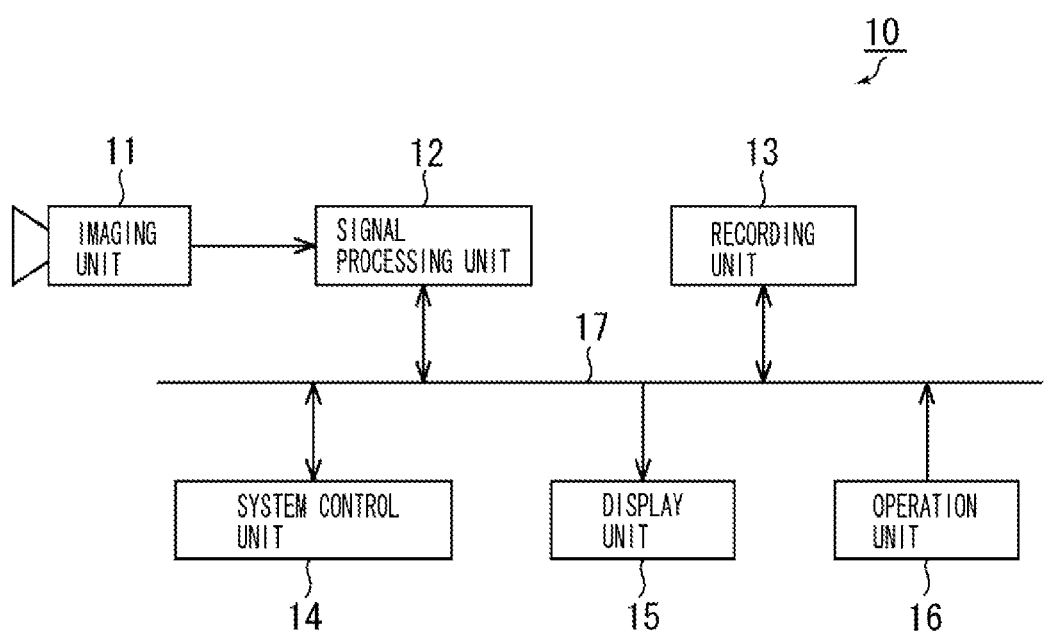
FIG. 1 illustrates an exemplary configuration of a video camera apparatus according to a first exemplary embodiment of the present invention.

Now, a first exemplary embodiment of the present invention will be described below. FIG. 1 illustrates a configuration of a video camera apparatus 10 according to the first exemplary embodiment. In the present embodiment, the video camera apparatus 10 that performs coding according to H.264 will be described as an example.

Referring to FIG. 1, an imaging unit 11 generates digital data of a photographed image using the optical system including a lens, a photoelectric conversion device, and an A/D conversion circuit, and stores the generated photographic image data in an image memory (not shown).

A signal processing unit 12 performs various signal processing on the photographed image data stored in the image memory, to convert the photographed image data into a format appropriate for displaying and recording. The signal processing unit 12 will be described in detail later with reference to FIG. 2.

A recording unit 13 records image data on a recording medium and reads the image data recorded on the recording medium. A semiconductor memory, for example, can be used as the recording medium.

A system control unit 14 controls the video camera apparatus 10 and performs various calculations. The system control unit 14 includes a central processing unit (CPU), a read-only memory (ROM), and a random access memory (RAM). The system control unit 14 controls the video camera apparatus 10 and performs various calculations by executing a program stored on the ROM with the CPU while using the RAM.

A signal processed by the signal processing unit 12 and a signal resulting from a calculation by the system control unit 14 are input into a display unit 15. The display unit 15 displays an image generated based on the input signal on a display device such as a liquid crystal display (LCD).

An operation unit 16 includes various switches and enables a user to generate various instructions for operating the video camera apparatus 10. A user can power on the video camera apparatus 10 by operating a main switch. The user can start or stop shooting (recording) an image by operating a recording start switch or a recording stop switch.

The signal processing unit 12, the recording unit 13, the system control unit 14, the display unit 15, and the operation unit 16 communicate with each other via a bus 17.

Figure 2:
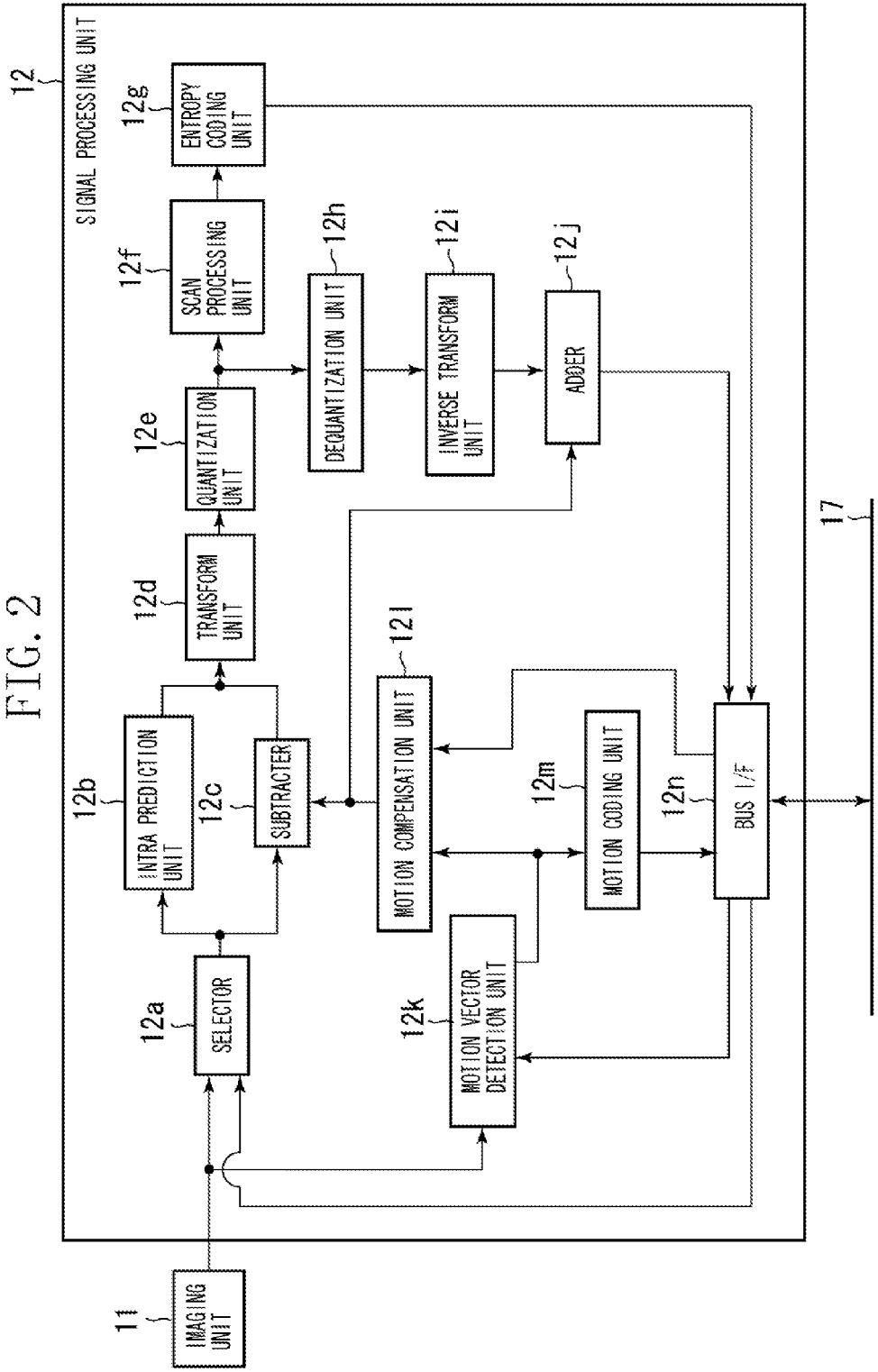
FIG. 2 illustrates a configuration of a signal processing unit according to the first exemplary embodiment of the present invention.

FIG. 2 illustrates a configuration of the signal processing unit 12 according to the first exemplary embodiment. Hereinafter, a picture to be coded and a reference picture used in prediction are described as a frame image. A frame image is hereinafter simply referred to as a "frame."

Referring to FIG. 2, a selector 12a enables a user to select an output destination of photographed image data read from the image memory in the imaging unit 11, according to a coding mode for intraframe or interframe coding. An intra prediction unit 12b receives photographed image data input from the selector 12a and performs intra prediction processing on the input photographed image data according to H.264 coding method.

A subtracter 12c subtracts prediction image data that is output from a motion compensation unit 12l, from photographed image data that is output from the selector 12a, to calculate motion prediction error data.

A transform unit 12*d* performs orthogonal transform on data output from the subtracter 12*c* or the intra prediction unit 12*b*, and outputs a resulting orthogonal transform coefficient obtained by the orthogonal transform to a quantization unit 12*e*. The quantization unit 12*e* quantizes the orthogonal transform coefficient output from the transform unit 12*d* and outputs all quantized orthogonal transform coefficients to a scan processing unit 12*f* and a dequantization unit 12*h*.

The scan processing unit 12*f* performs scan processing, such as zig-zag scanning, on the quantized orthogonal transform coefficient, according to a set coding mode. An entropy coding unit 12*g* entropy-codes an output from the scan processing unit 12*f* and outputs the entropy-coded data (coded data) to a bus interface (I/F) 12*n*.

The coded data output to the bus I/F 12*n* is supplied to the recording unit 13 via the bus 17 to be recorded by the recording unit 13. The coded data recorded by the recording unit 13 can also be transferred to and recorded on a recording medium such as a hard disk and an optical disk.

The dequantization unit 12*h* receives the quantized orthogonal transform coefficient input from the quantization unit 12*e* and dequantizes the input orthogonal transform coefficient. An inverse transform unit 12*i* performs inverse orthogonal transform on the orthogonal transform coefficient dequantized by the dequantization unit 12*h* and decodes the motion prediction error data obtained by calculation in the subtracter 12*c*.

An adder 12*j* adds the prediction error data output from the inverse transform unit 12*i* to prediction image data output from the motion compensation unit 12*l* to generate a decoded image (locally decoded image). The adder 12*j* outputs the generated decoded image data to the bus I/F 12*n*.

The decoded image data output to the bus I/F 12*n* is recorded in a frame memory provided in the recording unit 13 per frame as reference image data. Hereinafter, the reference image data recorded in the frame memory of the recording unit 13 may be referred to as a "reference candidate frame."

A motion vector detection unit 12*k* calculates an optimum motion vector according to a frame to be coded and a plurality of reference candidate frames. The motion vector detection unit 12*k* according to the present exemplary embodiment receives a frame number to be coded and a reference candidate frame number input from the system control unit 14 via the bus I/F 12*n*, and determines a search accuracy according to the received numbers. The motion vector detection unit 12*k* will be described in detail later with reference to FIG. 3.

The motion compensation unit 12*l* generates prediction image data based on the motion vector calculated by the motion vector detection unit 12*k* and a reference candidate frame having a smallest prediction error.

A motion coding unit 12*m* encodes the motion vector calculated by the motion vector detection unit 12*k* and outputs the coded motion vector to the bus I/F 12*n*. The coded motion vector output to the bus I/F 12*n* is recorded by the recording unit 13 in association with the coded data.

It is to be noted that any of forward prediction, in which a previous frame is referred to, bidirectional prediction, in which previous and following frames are respectively referred to, and backward prediction, in which a following frame is referred to, can be used in the present exemplary embodiment. Furthermore, a unit or device other than those illustrated in FIG. 2 can be provided in the signal processing unit 12.

Now, the motion vector detection unit 12*k* will be described in detail below.

Figure 3:
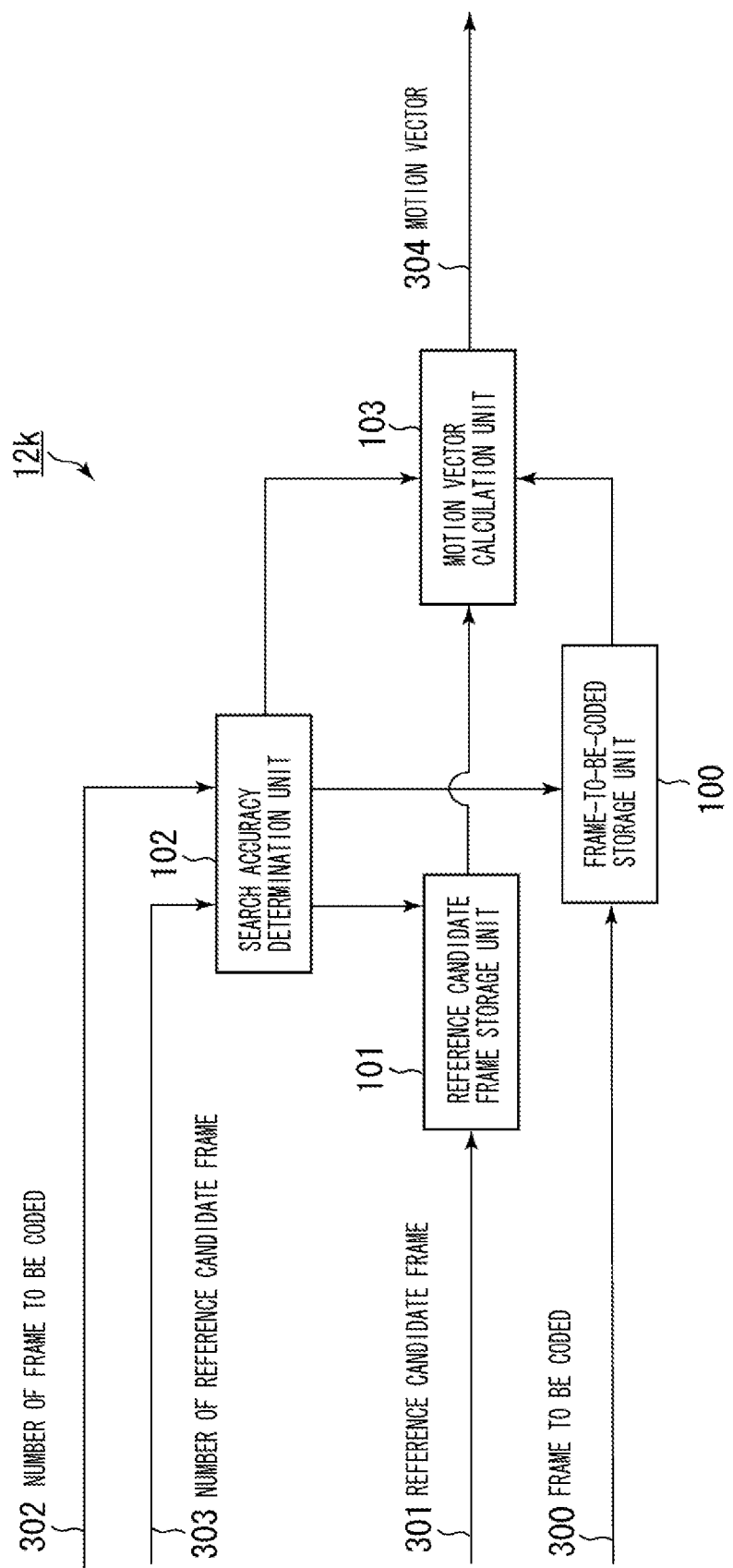
FIG. 3 illustrates a configuration of a motion vector detection unit according to the first exemplary embodiment of the present invention.

FIG. 3 illustrates a configuration of the motion vector detection unit 12*k* according to the present exemplary embodiment. The motion vector detection unit 12*k* (FIG. 3) is useful for a coding apparatus using H.264 or other similar coding methods. A coding apparatus using H.264 or other similar coding methods is useful for a video camera apparatus.

Referring to FIG. 3, the motion vector detection unit 12*k* includes a frame-to-be-coded storage unit 100, a reference candidate frame storage unit 101, a search accuracy determination unit 102, and a motion vector calculation unit 103.

The frame-to-be-coded storage unit 100 stores a frame to be coded 300, which is used in searching for a motion vector. The reference candidate frame storage unit 101 stores a plurality of reference candidate frames 301.

Figure 4:
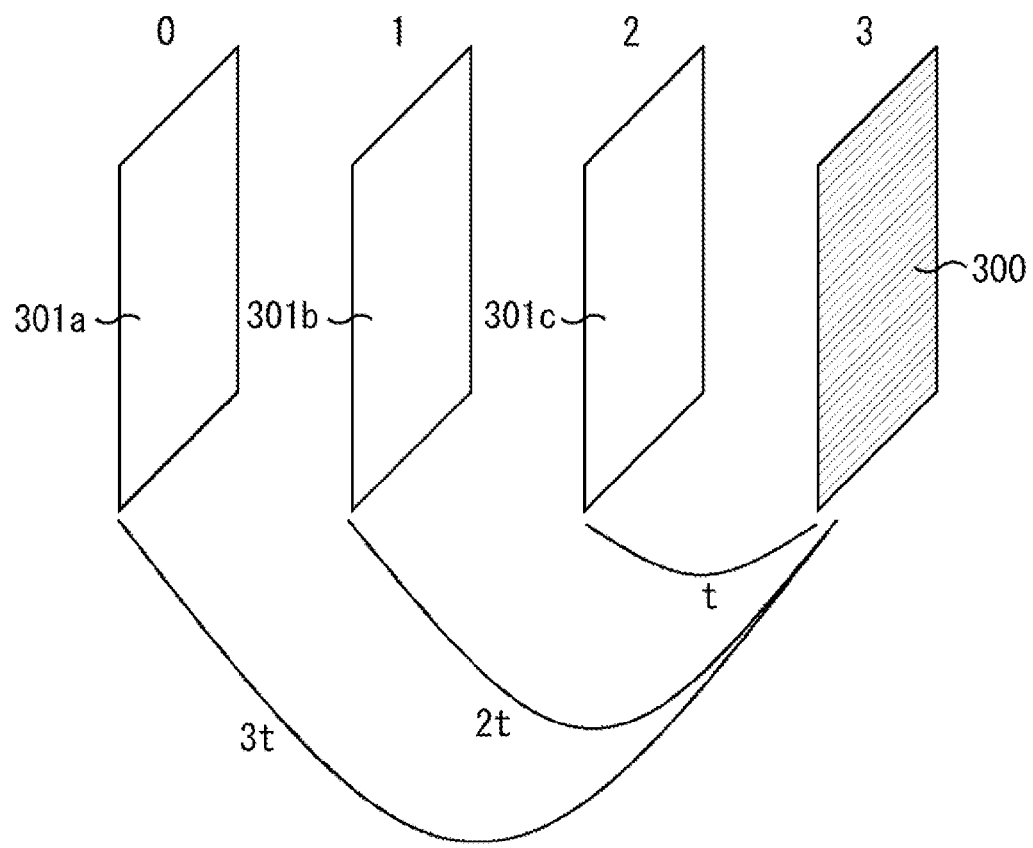
FIG. 4 illustrates an example of a relationship between a frame to be coded and a candidate frame according to the first exemplary embodiment of the present invention.

FIG. 4 illustrates an example of a relationship between a frame to be coded and a reference candidate frame according to the present exemplary embodiment. Referring to FIG. 4, three selectable reference frames 301*a* through 301*c* are candidates of a reference frame to the frame to be coded 300.

In the example illustrated in FIG. 4, the reference candidate frame 301*a* has a reference candidate frame number "0," the frame 301*b* has a frame number "1" and the frame 301*c* has a frame number "2." The frame to be coded 300 has a frame number "3." "3 t," "2 t," and "t" respectively represents a temporal distance (time interval) from the frame to be coded 300 to the reference candidate frames 301*a*, 301*b*, and 301*c*.

Figure 5:
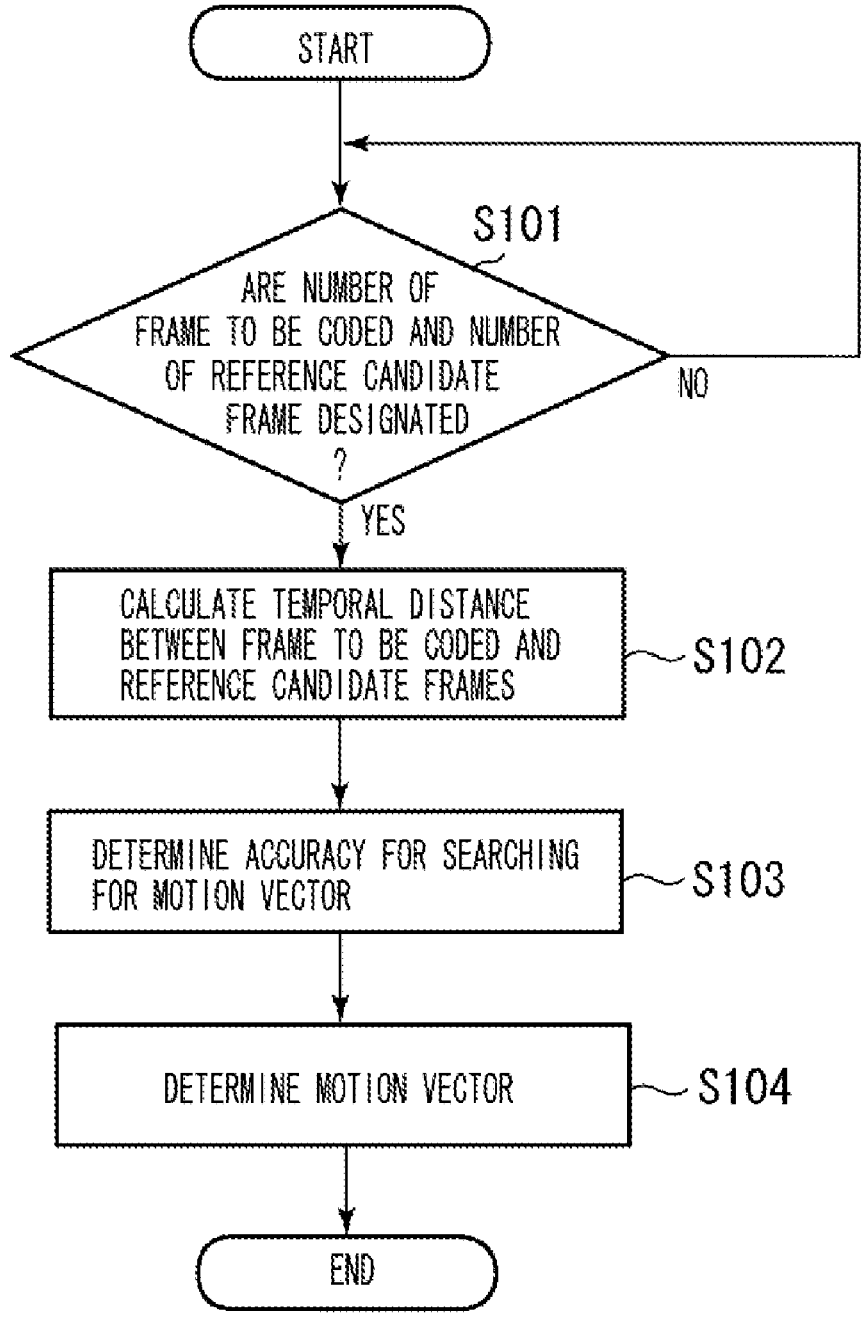
FIG. 5 is a flow chart illustrating an example of an operation of the motion vector detection unit according to the first exemplary embodiment of the present invention.

FIG. 5 is a flow chart illustrating an example of an operation of the motion vector detection unit 12*k* according to the present exemplary embodiment. Now, an exemplary operation of the motion vector detection unit 12*k* (FIG. 3) will be described below with reference to the flow chart of FIG. 5.

Referring to FIG. 5, in step S101, the search accuracy determination unit 102 waits until a frame number to be coded 302 and a reference candidate frame number 303 are designated and sent from the system control unit 14 via the bus I/F 12*n*. After the frame number to be coded 302 and the reference candidate frame number 303 are designated in step S101, the processing advances to step S102. In step S102, the search accuracy determination unit 102 calculates a temporal distance between the frame to be coded 300 and the reference candidate frames 301*a* through 301*c*.

In step S103, the search accuracy determination unit 102 adjusts a searching accuracy of a motion vector according to the temporal distance between the frame to be coded 300 and the reference candidate frames 301*a* through 301*c*.

More specifically, in the example illustrated in FIG. 4, the temporal distance between the reference candidate frame 301*c* whose number of reference candidate frame 303 is "2" and the frame to be coded 300 whose number of frame to be coded 302 is "3," is short as "t" (FIG. 4). Thus, a probability of finding an optimum motion vector in the reference candidate frame 301*c* is high in this case. Accordingly, the search accuracy determination unit 102 generates an instruction to the motion vector calculation unit 103 to perform close search for a motion vector with a one-pixel accuracy in both vertical and horizontal directions.

Meanwhile, the temporal distance between the reference candidate frame 301*a* whose number of reference candidate frame 303 is "0," and the frame to be coded 300 whose number of frame to be coded 302 is "3," is long (distant) as "3 t" (FIG. 4).

Accordingly, the probability of finding an optimum motion vector in the reference candidate frame 301*a* is lower than in the case of searching the reference candidate frame 301*c*. Accordingly, in this case, the search accuracy determination unit 102 generates an instruction to the motion vector calculation unit 103 to perform motion vector search with a relatively low accuracy of two-pixel in both vertical and horizontal directions.

Furthermore, the search accuracy determination unit 102 generates an instruction to the motion vector calculation unit 103 to perform motion vector search in the same search range as in the case of searching the reference candidate frame 301c.

Thus, in searching the reference candidate frame 301a for a motion vector, the motion vector calculation unit 103 searches in the same search range as in the case of searching the reference candidate frame 301c.

Furthermore, in this case, the motion vector calculation unit 103 searches for a motion vector with an accuracy half as high as the one used in searching the reference candidate frame 301c in both vertical and horizontal directions.

Thus, the amount of calculation in the case where the motion vector calculation unit 103 searches the reference candidate frame 301a for a motion vector can be reduced to ¼ compared with the case of searching the reference candidate frame 301c.

Here, a temporal distance between the reference candidate frame 301b whose number of reference candidate frame 303 is "1," and the frame to be coded 300 whose number of frame to be coded 302 is "3," is "2 t" (FIG. 4).

That is, the reference candidate frame 301b is temporally distant slightly from the frame to be coded 300, although not as distant as the temporal distance between the reference candidate frame 301a and the frame to be coded 300.

Accordingly, the probability of finding an optimum motion vector in the reference candidate frame 301b is higher than in the case of searching the reference candidate frame 301a but lower than in the case of searching the reference candidate frame 301c.

Accordingly, the search accuracy determination unit 102 generates an instruction to the motion vector calculation unit 103 to search for a motion vector with one-pixel accuracy in the vertical direction and with two-pixel accuracy in the horizontal direction. Furthermore, the search accuracy determination unit 102 generates an instruction to the motion vector calculation unit 103 to perform motion vector search in the same search range as in the case of searching the reference candidate frame 301c.

Thus, when the motion vector calculation unit 103 searches the reference candidate frame 301b for a motion vector, the motion vector calculation unit 103 performs the search with the same level of accuracy as in the case of searching the reference candidate frame 301c in the vertical direction, and with half the level of accuracy as in the case of searching the reference candidate frame 301c in the horizontal direction.

Accordingly, the amount of calculation in the case of searching the reference candidate frame 301b can be reduced to half of that in the case of searching the reference candidate frame 301c.

When the motion vector search accuracy is determined by the search accuracy determination unit 102 as described above, the processing advances to step S104. In step S104, the motion vector calculation unit 103 determines a motion vector 304.

More specifically, the motion vector calculation unit 103 performs a search on each macroblock included in the frame to be coded 300 that is stored in the frame-to-be-coded storage unit 100, within the reference candidate frame 301 stored in the reference candidate frame storage unit 101, to estimate a motion vector.

Here, suppose that the motion vector calculation unit 103 searches for a motion vector in a macroblock whose size is N×N ("N" is a natural number) in a range larger than the macroblock by ±p pixels ("p" is a natural number), the search range can be described by the following expression (1):

$$\text{Search range} = (N+2p) \times (N+2p) \quad (1)$$

The motion vector calculation unit 103, after calculating a correlation coefficient at a position expressed by "$(2p+1)^2$," which can be a motion vector candidate, determines that a position at which the degree of correlation becomes the highest, is a motion vector.

In order to estimate a motion vector having a maximum degree of correlation, the motion vector calculation unit 103 uses an evaluation function such as "mean square error" (MSE), "mean absolute error" (MAE), or "mean absolute difference" (MAD). For example, the MSE can be expressed by the following expression (2), and the MAE can be expressed by the following expression (3):

$$MSE(i, j, k) = \frac{1}{UV} \sum_{u=0}^{U} \sum_{v=0}^{V} [S_{cur,k}(x, y) - S_{ref}(x+i, y+j)]^2 \quad (2)$$

$$LRV(k) = \min MSE(i, j, k) \ (-X \le i \le X, -Y \le j \le Y)$$

$$MAE(i, j, k) = \frac{1}{UV} \sum_{u=0}^{U} \sum_{v=0}^{V} |S_{cur,k}(x, y) - S_{ref}(x+i, y+j)| \quad (3)$$

$$LRV(k) = \min MAE(i, j, k) \ (-X \le i \le X, -Y \le j \le Y)$$

Where "Sref" represents a reference frame, "Scur,k" represents a k-th macroblock in the frame currently searched for a motion vector, "(i,j)" represents a spatial position of a reference frame in the k-th macroblock in the frame currently searched for a motion vector, "X" represents a number of horizontal pixels in the motion vector search range, "Y" represents a number of vertical pixels in the motion vector search range.

Furthermore, "x" can be expressed by the following expression (4) and "y" can be expressed by the following expression (5):

$$x = g \times u \quad (4)$$

$$y = h \times v \quad (5)$$

Where "g" represents a coefficient indicating a search accuracy in the horizontal direction (coefficient indicating by how many pixels a calculation is to be performed) instructed from the search accuracy determination unit 102, and "h" represents a coefficient indicating a search accuracy in the vertical direction instructed from the search accuracy determination unit 102.

In addition, "x," "y," "g," and "h" respectively satisfy each of the following expressions (6) through (9):

$$0 \le x \le X \quad (6)$$

$$1 \le g \le X \quad (7)$$

$$0 \le y \le Y \quad (8)$$

$$1 \le h \le Y \quad (9)$$

Furthermore, "U" and "V" respectively satisfy each of the following expressions (10) and (11):

$$U = X - |i| \quad (10)$$

$$V = Y - |j| \quad (11)$$

The evaluation function expressed by the expression (2) or (3) is calculated according to difference in pixel values.

Accordingly, the motion vector calculation unit 103 determines a motion vector having a smallest MAE value or MSE value (that is, a motion vector having a lowest range value (LRV)) as a final motion vector in the current macroblock.

A function other than those illustrated in FIG. 3 can be provided in the motion vector detection unit 12k.

As described above, in the present exemplary embodiment, the motion vector search accuracy is changed according to the temporal distance between the frame to be coded 300 and the frames to be coded 301a to 301c. For example, the temporal distance between the reference candidate frame 301c and the frame to be coded 300, is short as "t" (FIG. 4). Thus, the probability of finding an optimum motion vector in the reference candidate frame 301c is high in this case.

Accordingly, the search accuracy determination unit 102 generates an instruction to the motion vector calculation unit 103 to perform a close search for a motion vector with a one-pixel accuracy in both vertical and horizontal directions.

Meanwhile, the temporal distance between the reference candidate frame 301a and the frame to be coded 300, is long (distant) as "3 t" (FIG. 4). Accordingly, the probability of finding an optimum motion vector in the reference candidate frame 301a is lower than in the case of searching the reference candidate frame 301c. Accordingly, in this case, the search accuracy determination unit 102 generates an instruction to the motion vector calculation unit 103 to perform a motion vector search in the same search accuracy as in the case of searching the reference candidate frame 301c, with a relatively low accuracy of two-pixel in both vertical and horizontal directions.

As described above, in the present exemplary embodiment, when a temporally distant frame (picture) is coded, the motion vector search accuracy is changed according to the probability of finding an optimum motion vector.

That is, since the motion vector search range is wide and includes a temporally distant frame, the accuracy for detecting a motion vector can be improved. Furthermore, by changing the motion vector search accuracy, the amount of calculation in detecting a motion vector can be reduced. Accordingly, decrease of shooting time due to increase in the battery consumption can be securely prevented.

The present exemplary embodiment describes three different cases, that is, a case where the search is performed with a one-pixel accuracy in both vertical and horizontal directions, a case performed with a two-pixel accuracy in both vertical and horizontal directions, and a case performed with a one-pixel accuracy in the vertical direction and with a two-pixel accuracy in the horizontal direction.

However, the search accuracy is not limited to these cases. For example, the reference candidate frame 301 can be searched with a three-pixel accuracy in both vertical and horizontal directions.

Furthermore, in the present exemplary embodiment, three reference candidate frames are used. However, the number of reference candidate frames is not limited to three but can be increased to more than three. In this case, where the number of reference candidate frames is increased, the search accuracy can also be gradually changed.

Second Exemplary Embodiment

Now, a second exemplary embodiment of the present invention will be described below. In the above-described first exemplary embodiment, the motion vector search accuracy is changed according to the temporal distance between the frame to be coded 300 and the reference candidate frames 301a through 301c.

In the present exemplary embodiment, a reduction rate of the reference candidate frames 301a through 301c is changed according to the temporal distance between the frame to be coded 300 and the reference candidate frames 301a through 301c.

That is, processing methods using the frame to be coded 300 and the reference candidate frames 301a to 301c are mainly different between the present exemplary embodiment and the first exemplary embodiment. Thus, units and portions that are the same as those in the first exemplary embodiment are provided with the same numerals and symbols as in FIGS. 1 through 5, and description thereof is not repeated here.

Figure 6:
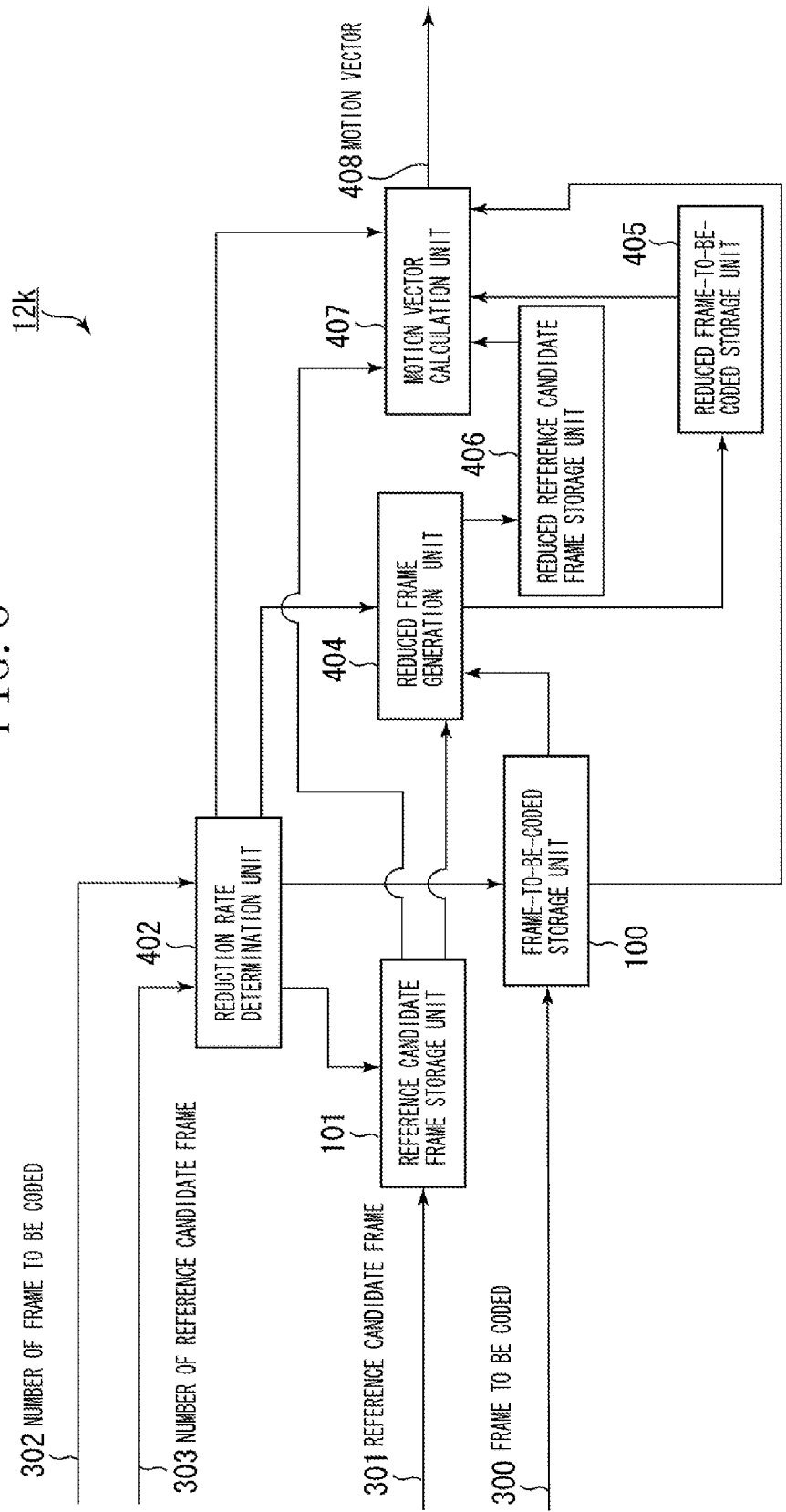
FIG. 6 illustrates a configuration of the motion vector detection unit according to a second exemplary embodiment of the present invention.
Figure 7:
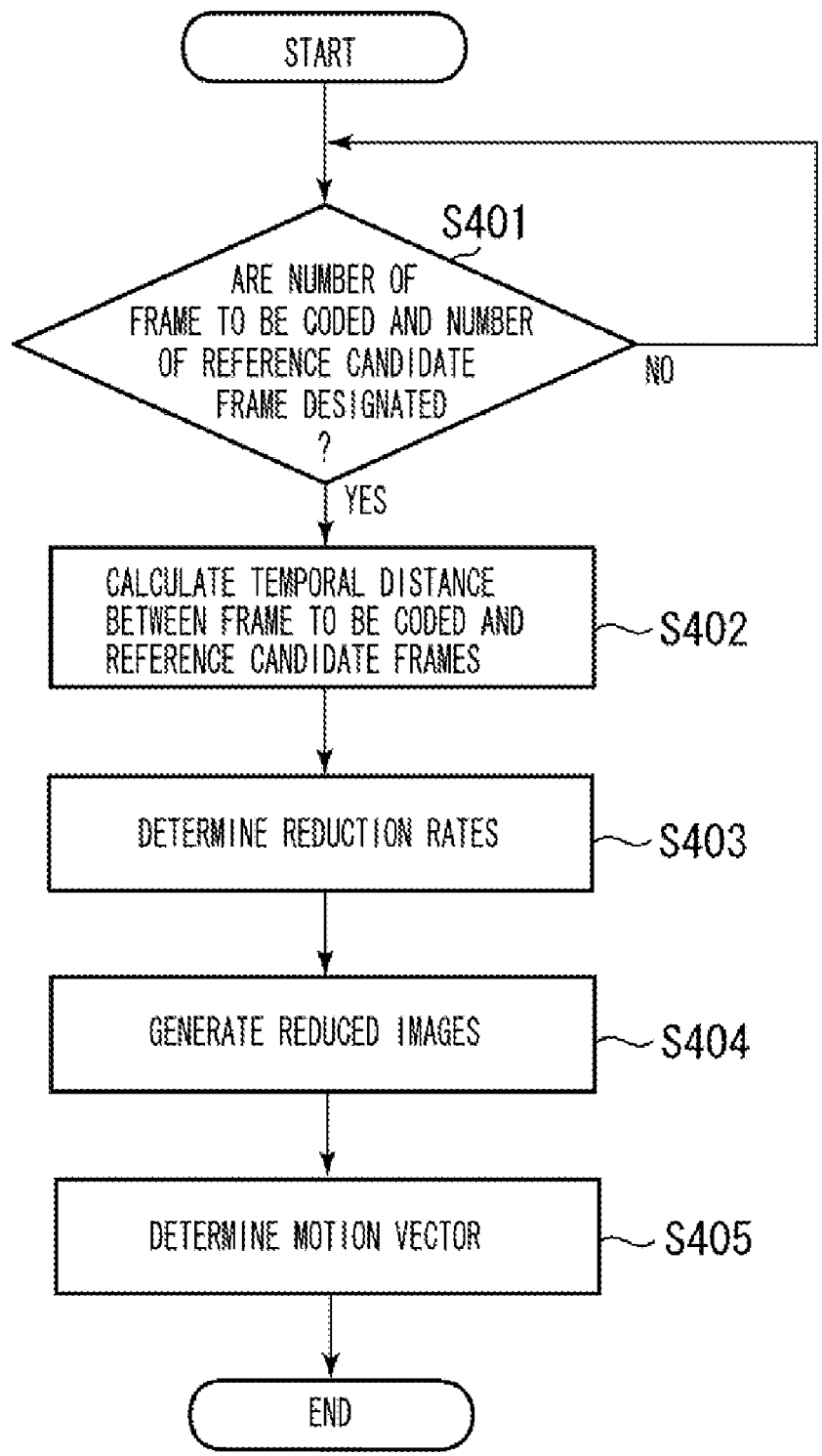
FIG. 7 is a flow chart illustrating an exemplary operation of the motion vector detection unit according to the second exemplary embodiment of the present invention.

FIG. 6 illustrates an exemplary configuration of the motion vector detection unit 12k according to the present exemplary embodiment. FIG. 7 is a flow chart illustrating an exemplary operation of the motion vector detection unit 12k according to the present exemplary embodiment.

The operation of the motion vector detection unit 12k illustrated in FIG. 6 will be described below with reference to FIGS. 4 and 7.

Referring to FIG. 6, the motion vector detection unit 12k includes a reduction rate determination unit 402, a reduced frame generation unit 404, a reduced-frame-to-be-coded storage unit 405, a reduced reference candidate frame storage unit 406, and a motion vector calculation unit 407.

The reduction rate determination unit 402 receives a designated number of frame to be coded 302 and number of reference candidate frame 303 from the system control unit 14 via the bus I/F 12n. Furthermore, the reduction rate determination unit 402 calculates a temporal distance between the frame to be coded 300 and the reference candidate frames 301a through 301c.

Moreover, the reduction rate determination unit 402 determines a reduction rate of an image in the frame to be coded 300 and the reference candidate frames 301a through 301c. In addition, the reduction rate determination unit 402 generates an instruction to the motion vector calculation unit 407 to search for a motion vector, and to the reduced frame generation unit 404 to reduce an image in the frame to be coded 300 and the reference candidate frames 301a through 301c. The operation of the reduction rate determination unit 402 will be described in detail later with reference to the flow chart of FIG. 7.

The reduced frame generation unit 404 receives an instruction from the reduction rate determination unit 402 and reduces the image in the frames to be coded 300 and the reference candidate frames 301a through 301c to generate a plurality of reduced images. The reduced-frame-to-be-coded storage unit 405 stores the reduced image of the frame to be coded 300 generated by the reduced frame generation unit 404. The reduced reference candidate frame storage unit 406 stores the reduced images of the reference candidate frames 301a through 301c generated by the reduced frame generation unit 404.

The motion vector calculation unit 407 receives an instruction from the reduction rate determination unit 402 and receives a reference candidate frame from the reference candidate frame storage unit 101. Furthermore, when reduction of an image is instructed from the reduction rate determination unit 402, the motion vector calculation unit 407 reads a macroblock of the reduced image in the frame to be coded 300 stored in the reduced-frame-to-be-coded storage unit 405 to search for and estimate a motion vector 408. Detailed operations of the reduced frame generation unit 404, the reduced-frame-to-be-coded storage unit 405, the reduced reference candidate frame storage unit 406, and the motion vector calculation unit 407 will be described in detail below with reference to the flow chart of FIG. 7.

Referring to FIG. 7, in step S401, the reduction rate determination unit 402 waits until a number of frame to be coded 302 and a number of reference candidate frame 303 are designated and sent from the system control unit 14 via the bus I/F 12n. When the number of frame to be coded 302 and the number of reference candidate frame 303 are designated by the system control unit 14 in step S401, the processing advances to step S402. In step S402, the reduction rate determination unit 402 calculates a temporal distance between the frame to be coded 300 and the reference candidate frames 301a through 301c.

In step S403, the reduction rate determination unit 402 determines a reduction rate of an image in the frame to be coded 300 and the reference candidate frames 301a through 301c, according to the calculated temporal distance between the frame to be coded 300 and the reference candidate frames 301a through 301c.

Here, the shorter the temporal distance between the frame to be coded 300 and the reference candidate frames 301a through 301c, the lower the reduction rate that the reduction rate determination unit 402 determines. On the other hand, the longer the temporal distance between the frame to be coded 300 and the reference candidate frames 301a through 301c, the higher the reduction rate.

More specifically, in the example illustrated in FIG. 4, the temporal distance between the reference candidate frame 301c whose number of reference candidate frame 303 is "2," and the frame to be coded 300 whose number of frame to be coded 302 is "3," is short as "t" (FIG. 4). Therefore, a probability of finding an optimum motion vector in the reference candidate frame 301c is high in this case.

Accordingly, the reduction rate determination unit 402 does not reduce the image, and generates an instruction to the motion vector calculation unit 103 to perform a search for a motion vector by directly using the images in the frame to be coded 300 and the reference candidate frames 301a through 301c.

On the other hand, the temporal distance between the reference candidate frame 301a whose number of reference candidate frame 303 is "0" and the frame to be coded 300 whose number of frame to be coded 302 is "3," is long as "3 t." Accordingly, the probability of finding an optimum motion vector in the reference candidate frame 301a is lower than in the case of searching the reference candidate frame 301c.

Accordingly, in this case, the reduction rate determination unit 402 generates an instruction to the reduced frame generation unit 404 to reduce the images in the frame to be coded 300 and the reference candidate frames 301a through 301c, to ½ times as large in both vertical and horizontal directions.

Furthermore, the reduction rate determination unit 402 generates an instruction to the motion vector calculation unit 407 to search for a motion vector in the same search range as in the case of searching the reference candidate frame 301c. Thus, the numbers of pixels in the vertical and horizontal directions are ½ times as large.

Accordingly, the calculation amount in the case of searching for a motion vector in the reference candidate frame 301a is ¼ times as much compared with the case of searching for a motion vector in the reference candidate frame 301c.

Here, the temporal distance between the reference candidate frame 301b whose number of reference candidate frame 303 is "1" and the frame to be coded 300 whose number of frame to be coded 302 is "3," is "2 t." That is, the reference candidate frame 301b is temporally distant slightly from the frame to be coded 300, although not so distant as the temporal distance between the reference candidate frame 301a and the frame to be coded 300.

Accordingly, the probability of finding an optimum motion vector in the reference candidate frame 301b is higher than in the case of searching the reference candidate frame 301a but lower than in the case of searching the reference candidate frame 301c.

The reduction rate determination unit 402 generates an instruction to the reduced frame generation unit 404 to reduce the images in the frame to be coded 300 and the reference candidate frames 301a through 301c, to ½ times as large in the horizontal direction without reducing the images in the vertical direction.

Furthermore, the reduction rate determination unit 402 generates an instruction to the motion vector calculation unit 407 to search for a motion vector in the same search range as in the case of searching the reference candidate frame 301c. Thus, the number of pixels of the images in the horizontal direction is reduced to ½ times as large.

Accordingly, the calculation amount in the case of searching for a motion vector in the reference candidate frame 301b can be reduced to ½ times compared with the case of searching for a motion vector in the reference candidate frame 301c.

When the reduction rate of the image in the frame to be coded 300 and the reference candidate frames 301a through 301c are determined by the reduction rate determination unit 402 as described above, the processing advances to step S404. In step S404, the reduced frame generation unit 404 reduces the images in the frame to be coded 300 and images in the reference candidate frames 301a through 301c, according to the reduction rate determined by the reduction rate determination unit 402, to generate a plurality of reduced images.

Figure 8:
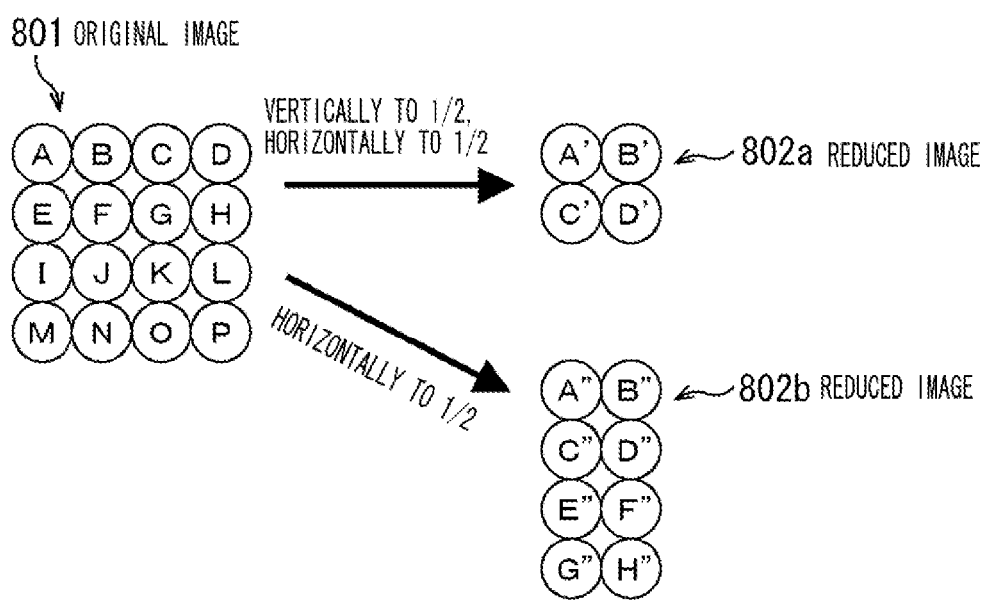
FIG. 8 illustrates an example of a reduced picture according to the second exemplary embodiment of the present invention.

FIG. 8 illustrates an example of the reduced images (picture) of the frame to be coded 300 and the reference candidate frames 301a through 301c according to the present exemplary embodiment.

Referring to FIG. 8, the reduced frame generation unit 404 reduces an original image 801 to be ½ times as large in both the vertical and horizontal directions and generates a reduced image 802a. In this case, the reduced frame generation unit 404 adds pixel values of every two adjacent pixels in both vertical and horizontal directions and divides the resulting pixel values by 4 to generate a reduced image 802a. For example, a pixel "A'" in the reduced image 802a can be generated by adding pixel values of pixels A, B, E, and F of the original image 801 and then dividing the resulting pixel value by 4 (namely, "(A+B+E+F)/4").

Furthermore, a pixel "B'" in the reduced image 802a can be generated by adding pixel values of pixels C, D, G, and H of the original image 801 and then dividing the resulting pixel value by 4 (by an expression "(C+D+G+H)/4").

In the case of generating a reduced image 802b by reducing the original image 801 (FIG. 8) to ½ times as large only in the horizontal direction, the reduced frame generation unit 404 adds pixel values of every two adjacent pixels in the horizontal direction and divides the resulting pixel value by 4 to generate a reduced image 802b.

For example, the pixel "A''" in the reduced image 802b can be generated by adding pixel values of pixels A and B of the original image 801 and then dividing the resulting pixel value by 2 (by an expression "(A+B)/2"). In addition, the pixel "B''" in the reduced image 802b can be generated by adding pixel values of pixels C and D of the original image 801 and then dividing the resulting pixel value by 2 (by an expression "(C+D)/2").

When the reduced images of the frame to be coded 300 and the reference candidate frames 301*a* through 301*c* are generated by the reduced frame generation unit 404, the reduced image of the frame to be coded 300 is stored in the reduced-frame-to-be-coded storage unit 405. The reduced images of the reference candidate frames 301*a* through 301*c* are stored in the reduced reference candidate frame storage unit 406.

In step S405, the motion vector calculation unit 407 determines a motion vector 408. Here, if the reduction rate determination unit 402 instructs that the images are not to be reduced, the motion vector calculation unit 407 does not use the reduced images and performs the same operation as the motion vector calculation unit 103 in the first exemplary embodiment.

On the other hand, if the reduction rate determination unit 402 instructs that the images are to be reduced, the motion vector calculation unit 407 reads a macroblock of the reduced image of the frame to be coded 300 from the reduced-frame-to-be-coded storage unit 405.

Then, the motion vector calculation unit 407 performs a search for motion vector in the read macroblock, within a range of the reduced images of the reference candidate frames 301*a* through 301*c* read from the reduced reference candidate frame storage unit 406, and estimates a motion vector according to a result of the motion vector search.

The method for estimating a motion vector having a highest degree of correlation is similar to that in the first exemplary embodiment. The motion vector detection unit 12*k* can include a function other than those illustrated in FIG. 6.

As described above, in the present exemplary embodiment, the reduction rate for the frame to be coded 300 and the reduction rate for the reference candidate frames 301*a* through 301*c* are changed according to the temporal distance between the frame to be coded 300 and the reference candidate frames 301*a* through 301*c*. For example, the temporal distance between the reference candidate frame 301*c* and the frame to be coded 300 is short as "t." Accordingly, the reduced frame generation unit 404 does not reduce the images in the frame to be coded 300 and in the reference candidate frame 301*c*.

Meanwhile, the temporal distance between the reference candidate frame 301*a* and the frame to be coded 300 is long as "3 t" (FIG. 4). Therefore, the probability of finding an optimum motion vector in the reference candidate frame 301*a* is low. Accordingly, in this case, the reduced frame generation unit 404 generates a reduced image by reducing the images in the frame to be coded 300 and in the reference candidate frame 301*c*, to be ½ times as large in both the vertical and horizontal directions. The motion vector calculation unit 407 determines a motion vector according to the reduced image generated by the reduced frame generation unit 404.

As described above, in the present exemplary embodiment, when a temporally distant image is coded, the reduction rate for the frame to be coded 300 and the reduction rate for the reference candidate frames 301*a* through 301*c* are changed according to the probability of finding an optimum motion vector.

Accordingly, the accuracy of detecting a motion vector can be improved, and an increase in the amount of calculations performed in detecting a motion vector can be securely prevented, as in the case of the first exemplary embodiment. Thus, decrease of shooting time due to increase in the battery consumption can be securely prevented.

In one example of the present exemplary embodiment, an example in which the image in the frame to be coded 300 and the images in the reference candidate frames 301*a* through 301*c* are reduced to be ½ times as large in both the vertical and horizontal directions. In another example, the image in the frame to be coded 300 and the images in the reference candidate frames 301*a* through 301*c* are reduced to be ½ times as large only in the horizontal direction without reducing the images in the vertical direction as above described. However, the reduction rate of the images in the frame to be coded 300 and in the reference candidate frames 301*a* through 301*c* are not limited to those rates.

For example, the image in the frame to be coded 300 and the images in the reference candidate frames 301*a* through 301*c* can be reduced to be ⅓ times or ¼ times as large in both the vertical and horizontal directions.

Furthermore, in the present exemplary embodiment, three reference candidate frames are used. However, the number of reference candidate frames is not limited to three. That is, four or more reference candidate frames can be used. In this case, the search accuracy can also be gradually changed.

Third Exemplary Embodiment

Now, a third exemplary embodiment of the present invention will be described below. In the above-described first exemplary embodiment, the motion vector search accuracy is changed only according to the temporal distance between the frame to be coded 300 and the reference candidate frames 301*a* through 301*c*.

The third exemplary embodiment has a configuration similar to the first exemplary embodiment, and the motion vector search accuracy is changed according to the temporal distance between the frame to be coded 300 and the reference candidate frames 301*a* through 301*c*, except that in the third exemplary embodiment, a motion vector search accuracy is changed also according to a "picture type" of the reference candidate frames 301*a* through 301*c*.

Accordingly, units and portions that are same as those in the first exemplary embodiment are provided with the same numerals and symbols as in FIGS. 1 through 5, and description thereof is not repeated here. Only the operation of the search accuracy determination unit 102, which is different from that in the first exemplary embodiment, will be described below in the present exemplary embodiment.

The H.264 coding method can perform encoding in the unit of a "slice," which is smaller than a picture and includes one or more macroblocks. Accordingly, the "picture type" can be substituted with and interpreted as a "slice type." In the following description, the exemplary embodiment using a slice type will be described.

Figure 9:
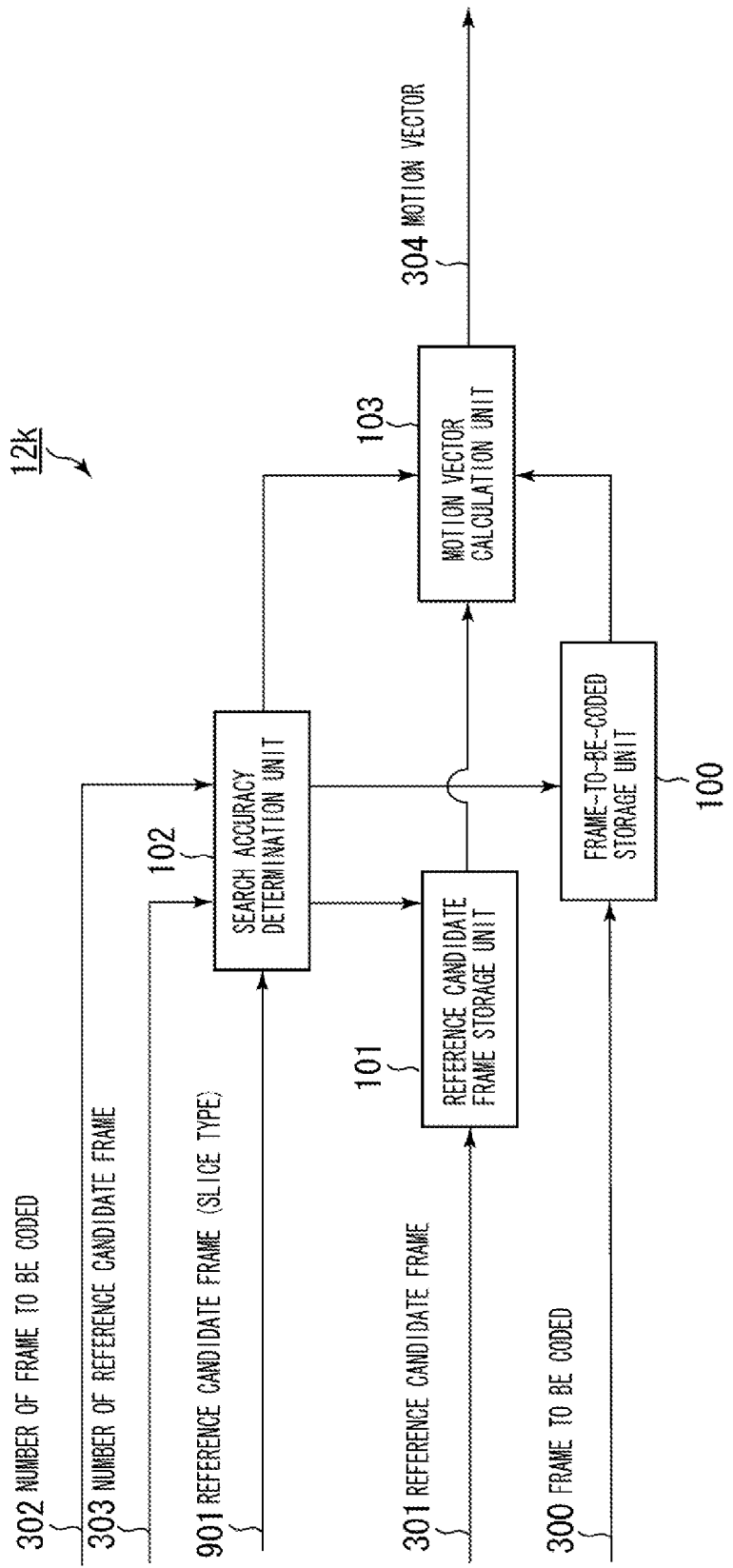
FIG. 9 illustrates a configuration of the motion vector detection unit according to a third exemplary embodiment of the present invention.
Figure 10:
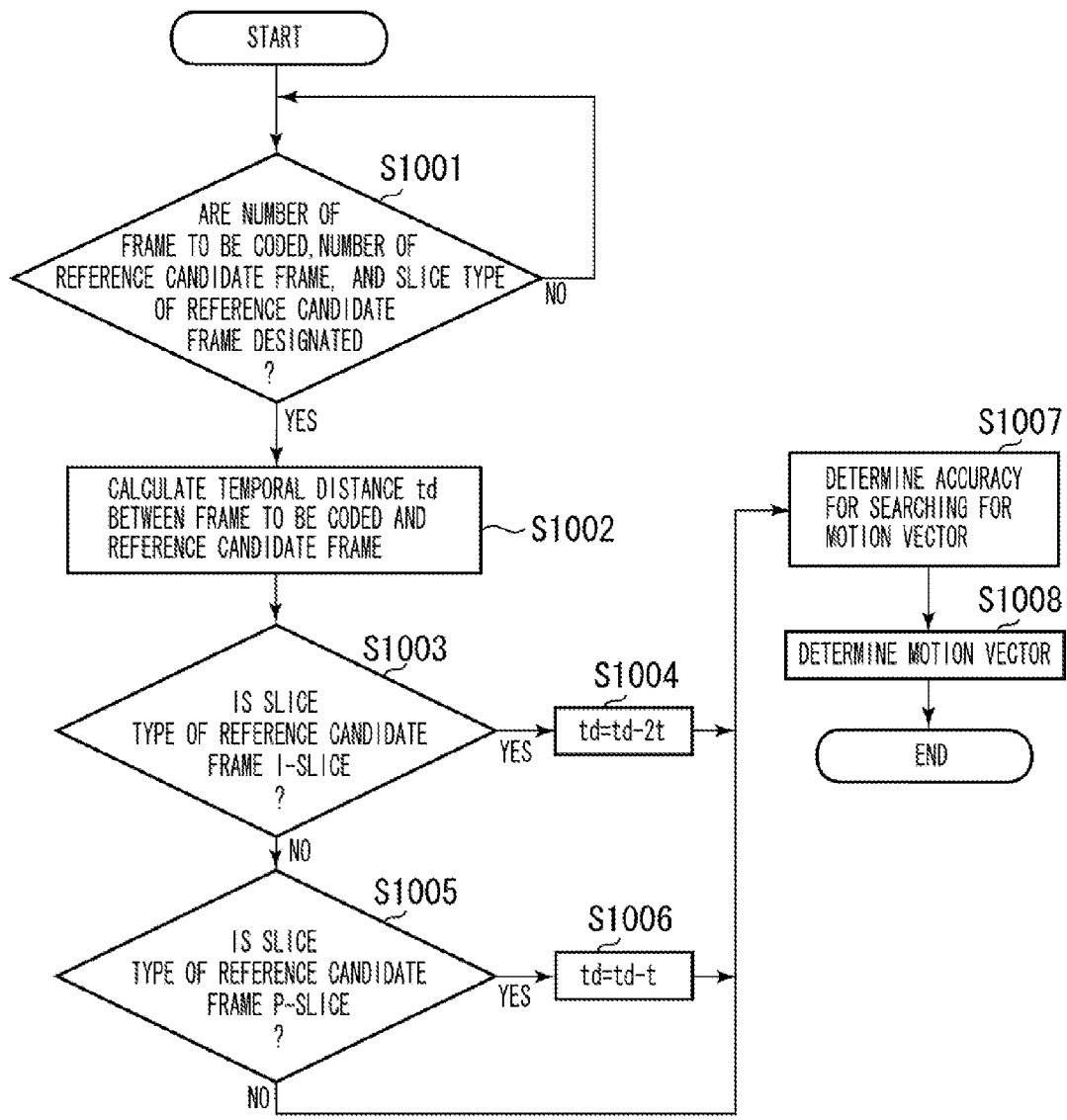
FIG. 10 is a flow chart illustrating an exemplary operation of the motion vector detection unit according to the third exemplary embodiment of the present invention.

FIG. 9 illustrates an exemplary configuration of the motion vector detection unit 12*k* according to the present exemplary embodiment. FIG. 10 is a flow chart illustrating an exemplary operation of the motion vector detection unit 12*k* according to the present exemplary embodiment.

The operation of the motion vector detection unit 12*k* illustrated in FIG. 9 will be described below with reference to FIG. 10.

Referring to FIG. 10, in step S1001, the search accuracy determination unit 102 waits until a number of frame to be coded 302, a number of reference candidate frame 303, and a slice type 901 (FIG. 9) of the reference candidate frames 301*a* through 301*c* are designated and sent from the system control unit 14 via the bus I/F 12*n*.

When the number of frame to be coded 302, the number of reference candidate frame 303, and the slice type 901 of the reference candidate frames 301*a* through 301*c* are designated by the system control unit 14 in step S1001, the processing advances to step S1002. In step S1002, the search accuracy determination unit 102 calculates a temporal distance "td"

between the frame to be coded 300 and the reference candidate frames 301a through 301c.

Here, as in the first exemplary embodiment, the search accuracy determination unit 102 gradually changes the motion vector search accuracy according to the calculated temporal distance td between the frame to be coded 300 and the reference candidate frames 301a through 301c. Furthermore, the search accuracy determination unit 102 changes the motion vector search accuracy according to a slice type 901 of the reference candidate frame. In step S1003, the search accuracy determination unit 102 detects whether slice type 901 of the reference candidate frame is an I slice.

If the slice type 901 of the reference candidate frame is an I slice (YES in step S1003), then the processing advances to step S1004. In step S1004, the search accuracy determination unit 102 subtracts a temporal distance value "2 t" from the value of the temporal distance td. Processing then advances to step S1007.

The amount of codes allocated to an I slice is generally large. Thus, an I slice is likely to be a reference candidate frame having a high image quality. Therefore, even if the temporal distance between the frame to be coded 300 and the reference candidate frames 301a through 301c is distant, when the reference candidate frame slice type 901 is an I slice, the search accuracy determination unit 102 subtracts 2t from the temporal distance td to improve the search accuracy.

On the other hand, if it is detected in step S103 that the reference candidate frame slice type 901 is not an I slice (NO in step S1003), then the processing advances to step S1005. In step S1005, the search accuracy determination unit 102 detects whether the reference candidate frame slice type 901 is a P slice.

If the reference candidate frame slice type 901 is a P slice (YES in step S1005), then the search accuracy determination unit 102 advances to step S1006. In step S1006, the search accuracy determination unit 102 subtracts a temporal distance value "t" from the temporal distance td. Processing then advances to step S1007.

P slice is generally lower in image quality than an I slice. However, a P slice generally has an image quality higher than a B slice. Therefore, even if the temporal distance between the frame to be coded 300 and the reference candidate frames 301a through 301c is long, when the reference candidate frame slice type 901 is a P slice, the search accuracy determination unit 102 subtracts the temporal distance value t from the temporal distance td to improve the search accuracy so that the accuracy becomes higher than a B slice but lower than an I slice.

On the other hand, if it is detected in step S1005 that the reference candidate frame slice type 901 is not a P slice (NO in step S1005), then the search accuracy determination unit 102 advances to step S1007. That is, when the reference candidate frame slice type 901 is not an I or P slice but a B slice, the search accuracy determination unit 102 does not perform weighting processing to raise the search accuracy but determines the search accuracy only according to the temporal distance between frames.

In the conventional MPEG coding method, a B picture that is equivalent to a B slice in H.264, cannot be set as a reference frame. However, in H.264, a B slice can be set as a reference frame. Accordingly, a B slice can be regarded as one of reference candidate frames.

In step S1007, the search accuracy determination unit 102 changes the motion vector search accuracy according to the temporal distance td calculated as described above.

Figure 11:
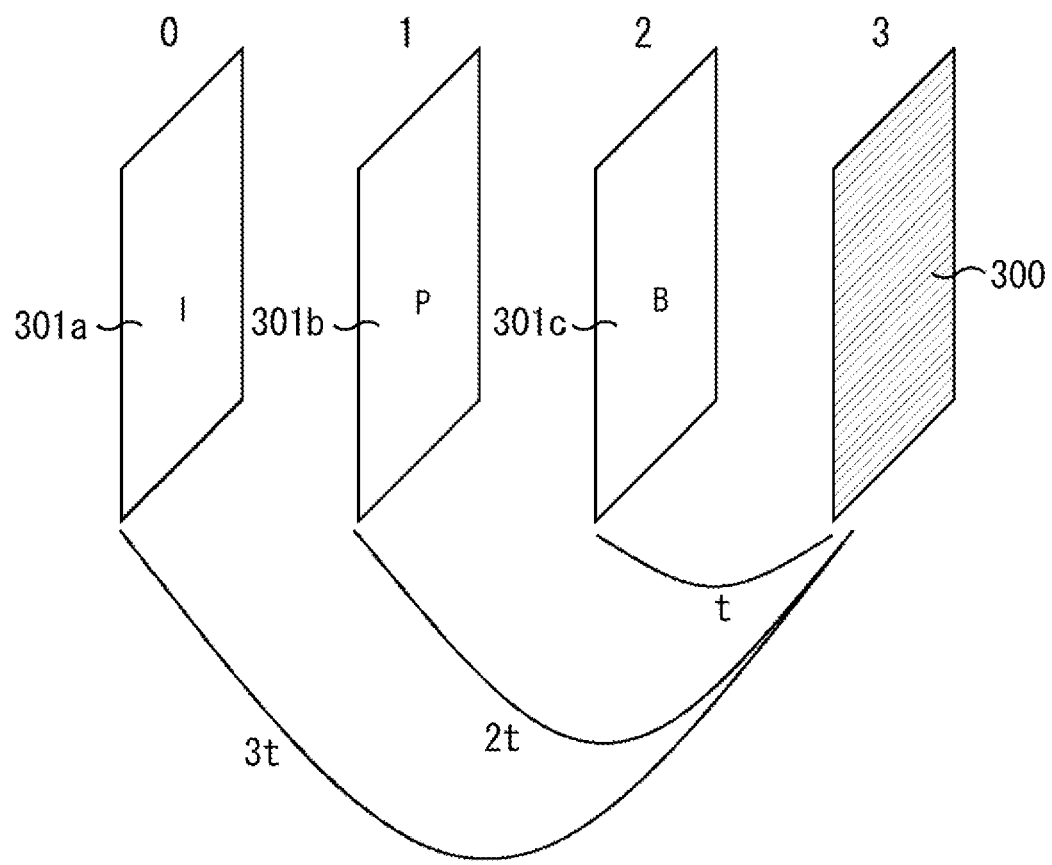
FIG. 11 illustrates an example of a relationship between the frame to be coded and the candidate reference frame according to the third exemplary embodiment of the present invention.

FIG. 11 illustrates an example of a relationship between the frame to be coded and the reference candidate frame according to the present exemplary embodiment.

In the example illustrated in FIG. 11, the temporal distance td between the reference candidate frame 301c whose number of reference candidate frame 303 is "2," and the frame to be coded 300 whose number of frame to be coded 302 is "3," is "t." The temporal distance td between the reference candidate frame 301b whose number of reference candidate frame 303 is "1" and the frame to be coded 300 is "2 t." The temporal distance td between the reference candidate frame 301a whose number of reference candidate frame 303 is "0" and the frame to be coded 300 is "3 t."

Here, since the reference candidate frame 301a is an I slice, the temporal distance td (in this case, td=3 t) between the frame to be coded 300 and the reference candidate frame 301a is changed to "t" by subtracting the temporal distance value "2 t" therefrom. Furthermore, since the reference candidate frame 301b is a P slice, the temporal distance td (in this case, td=2 t) between the frame to be coded 300 and the reference candidate frame 301b is changed to "t" by subtracting the temporal distance value "t" therefrom. Thus, in the example illustrated in FIG. 11, the temporal distance td between the reference candidate frames 301a through 301c and the frame to be coded 300 is "t."

That is, the present exemplary embodiment, which retains effects of the first exemplary embodiment, can in addition raise the search accuracy to be as high as an immediately preceding frame when the reference candidate frame 301 is an I slice, even if the reference candidate frame 301 is distant from the frame to be coded 300.

Further, the third exemplary embodiment can raise the search accuracy to be as high as an immediately preceding frame when the reference candidate frames 301 is a P slice even if the reference candidate frame 301 is temporally distant from the frame to be coded 300. In this case, the total number of search operations to be performed is the same as the first exemplary embodiment.

In step S1008, when the search accuracy determination unit 102 determines the motion vector search accuracy, the motion vector calculation unit 103 determines a motion vector 304. The detailed processing for determining the motion vector 304 is similar to the first exemplary embodiment. Accordingly, the description thereof is not repeated here.

As described above, the present exemplary embodiment changes the motion vector search accuracy according to not only the temporal distance between the frame to be coded 300 and the reference candidate frames 301a through 301c but also the probability of finding an optimum motion vector, considering the slice type 901 of the reference candidate frames 301a through 301c.

Accordingly, since the motion vector search range includes a temporally distant frame, the accuracy for detecting a motion vector can be improved. Furthermore, by changing the motion vector search accuracy, the amount of calculation in detecting a motion vector can be reduced. Accordingly, decrease of shooting time due to increase in the battery consumption can be securely prevented.

Furthermore, the present exemplary embodiment considers the reference candidate frame slice type (picture type) 901 so that the motion vector search accuracy can be improved. Accordingly, decrease of shooting time due to increase in the battery consumption can be securely prevented.

In the present exemplary embodiment, the value "2 t" is subtracted from the temporal distance value td in the case of an I slice. Furthermore, the value "t" is subtracted from the temporal distance value td in the case of a P slice. However, the values are mere examples, and the value to be subtracted is not limited to those described above. For example, the value "t" can be subtracted from the temporal distance value td in the case of an I slice, and a value "0.5 t" can be subtracted from the temporal distance value td in the case of a P slice.

In addition, the present exemplary embodiment changes the motion vector search accuracy. However, similar to the second exemplary embodiment, the third exemplary embodiment can change the reduction rate of the image in the frame to be coded 300 and the image in the reference candidate frames 301a through 301c, according to the reference candidate frame slice type (picture type) 901.

Fourth Exemplary Embodiment

Now, a fourth exemplary embodiment of the present invention will be described below.

In the above-described first exemplary embodiment, the motion vector search accuracy is changed only according to the temporal distance between the frame to be coded 300 and the reference candidate frames 301a through 301c.

The fourth exemplary embodiment has a configuration similar to the first exemplary embodiment, except that the present exemplary embodiment includes a peak signal-to-noise ratio (PSNR) calculation unit 12o in the signal processing unit 12.

The present exemplary embodiment changes the motion vector search accuracy according to not only the temporal distance between the frame to be coded 300 and the reference candidate frames 301a through 301c but also a PSNR of the reference candidate frames 301a through 301c.

Accordingly, the same units and portions as those in the first exemplary embodiment are provided with the same numerals and symbols as FIGS. 1 through 5, and description thereof is not repeated here. The operation of the search accuracy determination unit 102 and the PSNR calculation unit 12o will be described below in the present exemplary embodiment.

Figure 12:
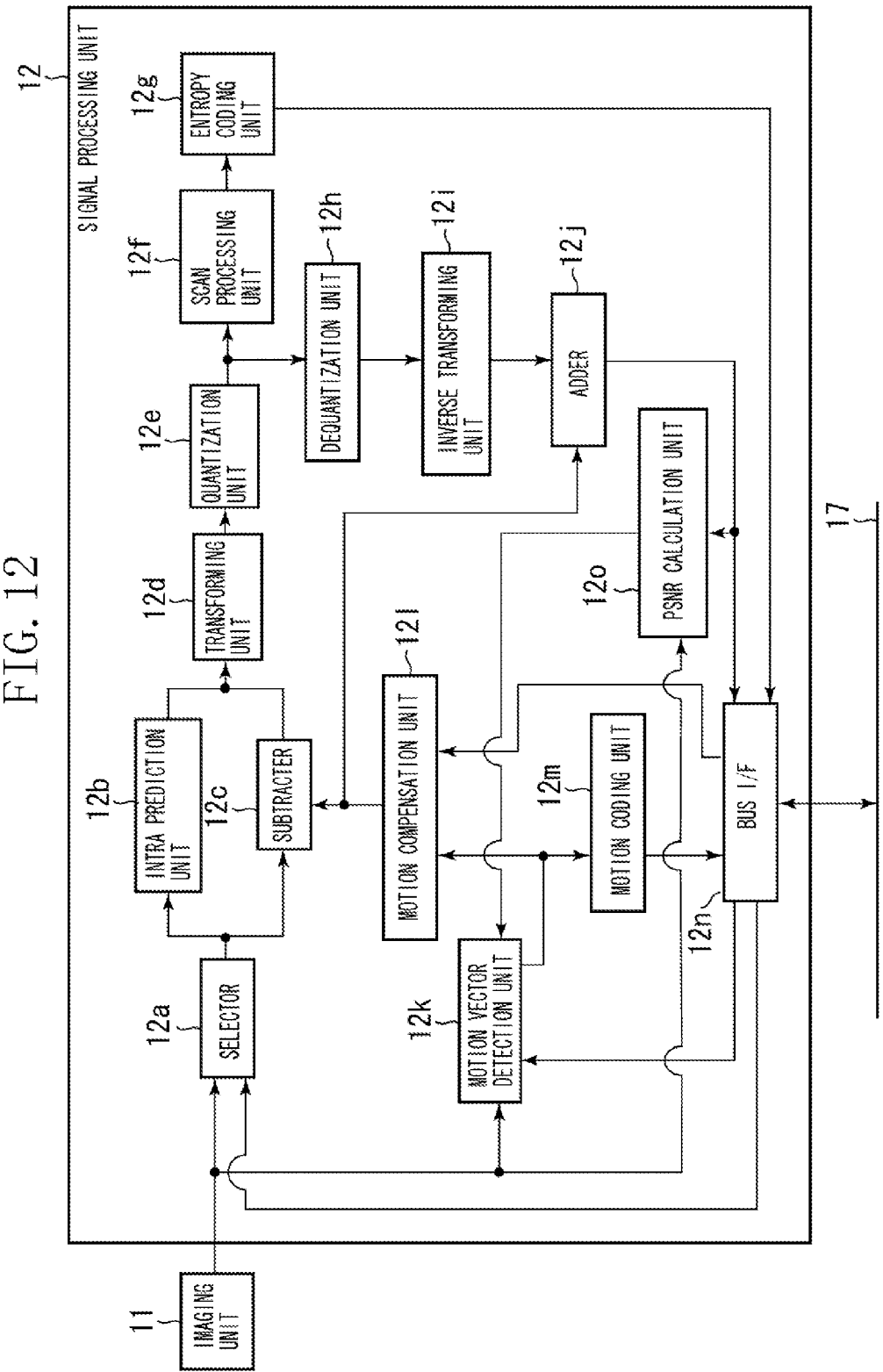
FIG. 12 illustrates a configuration of the signal processing unit according to a fourth exemplary embodiment of the present invention.

FIG. 12 illustrates an exemplary configuration of the signal processing unit 12 according to the present exemplary embodiment.

In the present exemplary embodiment, only the operation of the PSNR calculation unit 12o of the signal processing unit 12, which is different from the first exemplary embodiment, will be described, and the description of components similar to the first exemplary embodiment will not be repeated here.

Referring to FIG. 12, the PSNR calculation unit 12o compares image data input from the imaging unit 11 and yet to be coded, and decoded image data input from the adder 12j. Further, the PSNR calculation unit 12o calculates a value of a PSNR, which indicates a degree of image deterioration, according to the following expression (12):

$$PSNR = 10\log_{10} \frac{N \times M \times T^2}{\sum_{i=0}^{N} \sum_{j=0}^{M} \{p(i,j) - p'(i,j)\}^2} \quad (12)$$

where "N" and "M" respectively represent a number of pixels in the vertical and horizontal directions, p(i,j) represents a pixel value at a position (i,j) of the image data yet to be coded, p' (i,j) represents a pixel value at the position (i,j) of the decoded image data, and "T" represents a figure obtained by subtracting 1 from the number of gradations of the image (namely, in the case of an image of 8 bits per pixel, T=255).

The PSNR value calculated by the PSNR calculation unit 12o is sent to the motion vector detection unit 12k (FIG. 12) to be used to change the motion vector search accuracy.

Figure 13:
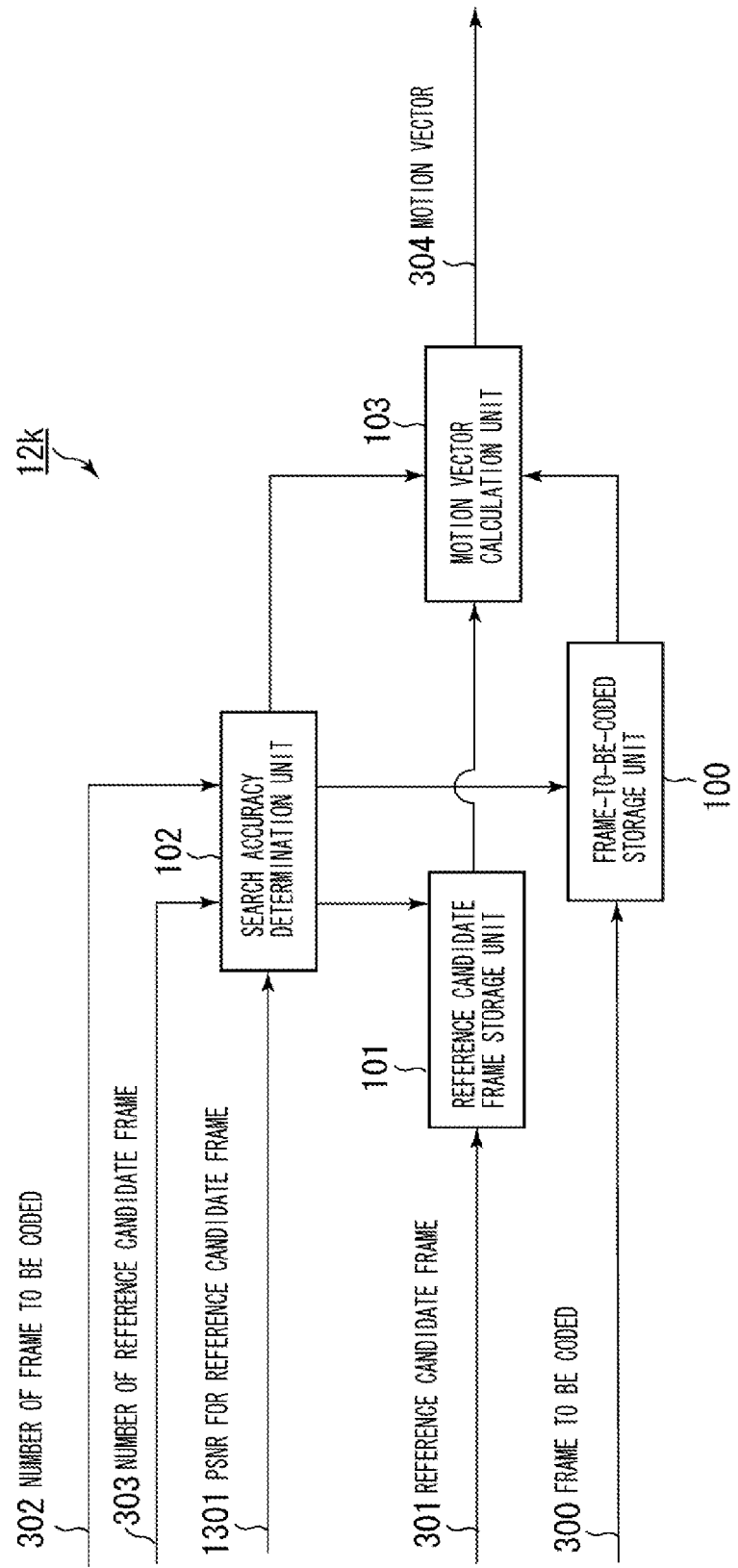
FIG. 13 illustrates a configuration of the motion vector detection unit according to the fourth exemplary embodiment of the present invention.
Figure 14:
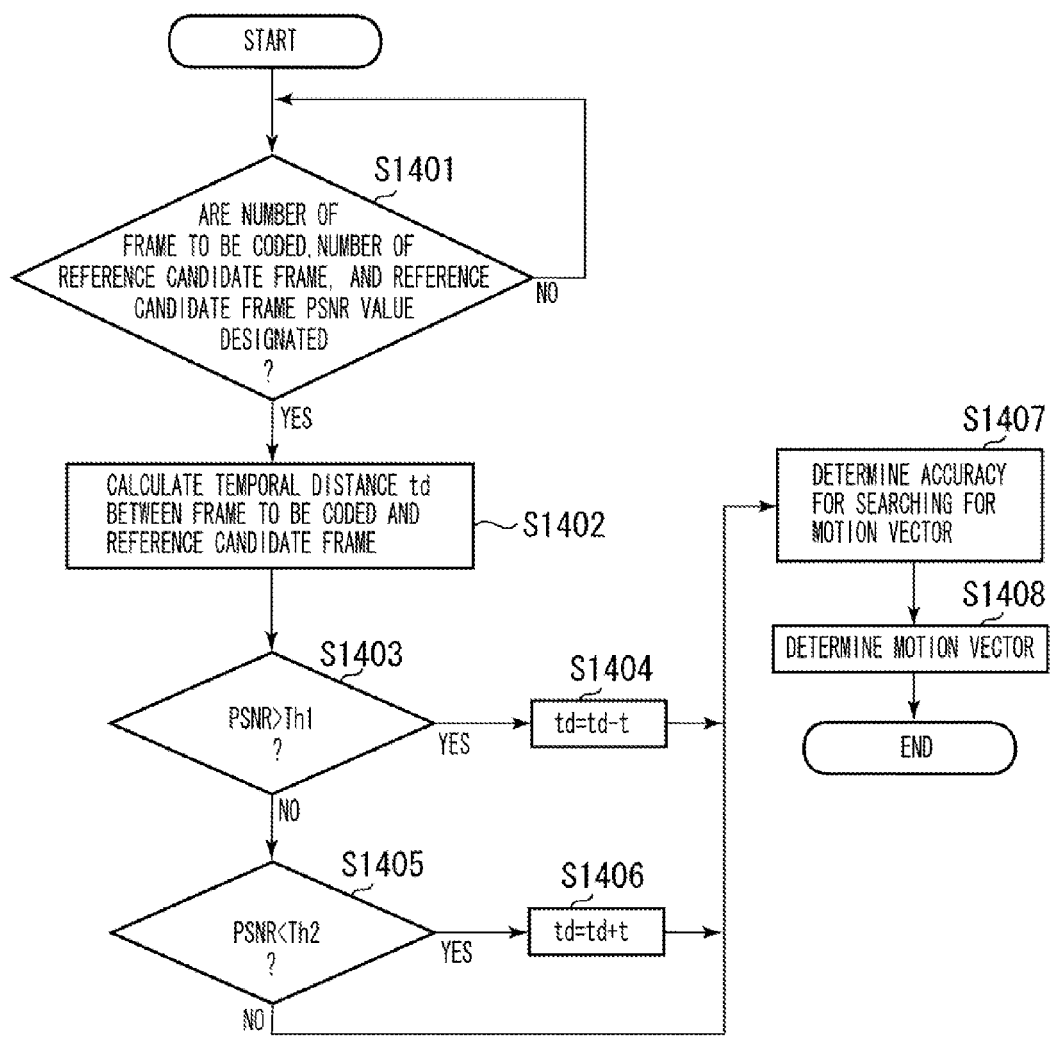
FIG. 14 is a flow chart illustrating an exemplary operation of the motion vector detection unit according to the fourth exemplary embodiment of the present invention.

FIG. 13 illustrates an exemplary configuration of the motion vector detection unit 12k according to the present exemplary embodiment. FIG. 14 is a flow chart illustrating an exemplary operation of the motion vector detection unit 12k according to the present exemplary embodiment.

The operation of the motion vector detection unit 12k illustrated in FIG. 13 will be described below with reference to FIG. 14.

Referring to FIG. 14, in step S1401, the search accuracy determination unit 102 waits until a number of frame to be coded 302, a number of reference candidate frame 303, and a reference candidate frame PSNR value 1301 (FIG. 13) of the reference candidate frames 301a through 301c are designated and sent from the system control unit 14 via the bus I/F 12n.

When the number of frame to be coded 302, the number of reference candidate frame 303, and the reference candidate frame PSNR value 1301 of the reference candidate frames 301a through 301c are designated by the system control unit 14 in step S1401, the processing advances to step S1402. In step S1402, the search accuracy determination unit 102 calculates a temporal distance "td" between the frame to be coded 300 and the reference candidate frames 301a through 301c.

Similar to the first exemplary embodiment, the search accuracy determination unit 102 gradually changes the motion vector search accuracy according to the calculated temporal distance td between the frame to be coded 300 and the reference candidate frames 301a through 301c. Furthermore, the search accuracy determination unit 102 changes the motion vector search accuracy according to the PSNR value 1301 of the reference candidate frame. In step S1403, the search accuracy determination unit 102 detects whether the PSNR value 1301 of the reference candidate frame is greater than a predetermined threshold value "Th1."

If it is detected in step S1403 that the PSNR value 1301 of the reference candidate frame is greater than the predetermined threshold value Th1, that is, if the PSNR value 1301 of the reference candidate frame satisfies an expression "PSNR>Th1" (YES in step S1403), then the search accuracy determination unit 102 advances to step S1404. In step S1404, the search accuracy determination unit 102 subtracts a value "t" from the temporal distance td. Processing then advances to step S1407.

Generally, in the case where the PSNR is high, only small deterioration occurs in a reference candidate frame. In this case, such a reference candidate frame is likely to be useful as a reference frame. Accordingly, if the PSNR value 1301 of the reference candidate frame satisfies the expression "PSNR>Th1," the search accuracy determination unit 102 raises the motion vector search accuracy by subtracting the value t from the temporal distance value td, even when the temporal distance between the frame to be coded 300 and the reference candidate frames 301a through 301c is long.

The threshold value Th1 can be set to be, for example, a fixed value of 30 dB, which is a practical level of image quality in the standard definition (SD).

In order to address a case where the PSNR of most decoded images is less than 30 dB, the threshold value Th1 can be a variable threshold value that is calculated by updating an average value of the PSNR of the decoded image as needed.

On the other hand, if it is detected in step S1403 that the PSNR value 1301 of the reference candidate frame does not satisfy the expression "PSNR>Th1" (NO in step S1403), then the processing advances to step S1405. In step S1405, the search accuracy determination unit 102 detects whether the PSNR value 1301 of the reference candidate frame is less than a predetermined threshold value "Th2" (where Th2<Th1).

If the PSNR value 1301 of the reference candidate frame is less than the predetermined threshold value "Th2," that is, if the PSNR value 1301 of the reference candidate frame satisfies the expression "PSNR<Th2" (YES in step S1405), then the search accuracy determination unit 102 advances to step S1406. In step S1406, the search accuracy determination unit 102 adds the value "t" to the temporal distance value td. The threshold value Th2 is set in a manner similar to the threshold value Th1. Processing then advances to step S1407.

Generally, in the case where the PSNR is low, it is likely that the reference candidate frame is in a considerably deteriorated condition and such a reference candidate frame is inappropriate for use as a reference frame.

Accordingly, if the PSNR value 1301 of the reference candidate frame satisfies the expression "PSNR<Th2," the search accuracy determination unit 102 lowers the motion vector search accuracy by adding the value t to the temporal distance value td, even when the temporal distance between the frame to be coded 300 and the reference candidate frames 301a through 301c is short.

On the other hand, if it is detected in step S1405 that the PSNR value 1301 of the reference candidate frame does not satisfy the expression "PSNR<Th2" (NO in step S1405), then the processing advances to step S1407. Namely, if the PSNR is neither high nor low, that is, if the PSNR is at an intermediate level, the search accuracy determination unit 102 determines the motion vector search accuracy only according to the temporal distance between the frame to be coded 300 and the reference candidate frames 301a through 301c.

In step S1407, the search accuracy determination unit 102 changes the motion vector search accuracy according to the temporal distance value td thus calculated.

As described above, the present exemplary embodiment, which retains effects of the first exemplary embodiment, can in addition raise the search accuracy when the PSNR value 1301 of the reference candidate frame is great, even if the reference candidate frame 301 is distant from the frame to be coded 300. Further, the present exemplary embodiment can lower the search accuracy when the PSNR value 1301 of the reference candidate frame is small even if the reference candidate frame 301 is temporally close to the frame to be coded 300.

After the motion vector search accuracy is determined by the search accuracy determination unit 102 in step S1407, then the processing advances to step S1408. In step S1408, the motion vector calculation unit 103 determines a motion vector 304. The detailed processing for determining a motion vector 304 is similar to the first exemplary embodiment. Accordingly, the description thereof is not repeated here.

As described above, the present exemplary embodiment changes the motion vector search accuracy according to not only the temporal distance between the frame to be coded 300 and the reference candidate frames 301a through 301c but also the probability of finding an optimum motion vector, considering the PSNR value 1301 of the reference candidate frames 301a through 301c.

Accordingly, while the motion vector search range includes a temporally distant frame, the accuracy for detecting a motion vector can also be improved. Furthermore, by changing the motion vector search accuracy, the amount of calculation in detecting a motion vector can be reduced. Accordingly, decrease of shooting time due to increase in the battery consumption can be securely prevented.

Furthermore, the present exemplary embodiment considers the PSNR value 1301 of the reference candidate frame so that the motion vector search accuracy can be improved. Accordingly, decrease of shooting time due to increase in the battery consumption can be securely prevented.

In the present exemplary embodiment, the value "t" is subtracted from the temporal distance value td in the case where the PSNR value 1301 of the reference candidate frame is high. However, the value is a mere example, and the value to be subtracted is not limited to "t." For example, a value "0.5 t" can be subtracted from the temporal distance value td in the case where the PSNR value 1301 of the reference candidate frame is high.

Furthermore, in the present exemplary embodiment, the motion vector search accuracy is determined (changed) by correcting the temporal distance value td according to the PSNR value 1301 of the reference candidate frame. Alternatively, the PSNR value 1301 of the reference candidate frame can be corrected according to the temporal distance value td. In this case, the motion vector search accuracy can also be determined according to the corrected PSNR value 1301 of reference candidate frame.

That is, in the case where the temporal distance value td is great and the temporal distance between the frame to be coded 300 and the reference candidate frames 301a through 301c is long, the search accuracy determination unit 102 can correct the PSNR value 1301 of the reference candidate frame by subtracting a greater value therefrom.

On the other hand, in the case where the temporal distance value td is small and the temporal distance between the frame to be coded 300 and the reference candidate frames 301a through 301c is short, the search accuracy determination unit 102 can skip correction on the PSNR value 1301 of the reference candidate frame. If the corrected PSNR value 1301 of the reference candidate frame is great, the search accuracy determination unit 102 can raise the motion vector search accuracy. On the other hand, if the corrected PSNR value 1301 of reference candidate frame is small, the search accuracy determination unit 102 can lower the motion vector search accuracy.

In addition, the present exemplary embodiment changes the motion vector search accuracy. However, similar to the second exemplary embodiment, the present exemplary embodiment can change the reduction rate of the image in the frame to be coded 300 and the image in the reference candidate frames 301a through 301c, according to the PSNR value 1301 of the reference candidate frame.

Other Exemplary Embodiments

The present invention can also be achieved by providing a system or an apparatus with a storage medium storing program code (software) implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above. As the storage medium for supplying such program code, a flexible disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD), for example, can be used.

In addition, the functions according to the embodiments described above can be implemented not only by executing the program code read by the computer, but also implemented by the processing in which an operating system (OS) or other application software carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit can carry out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2006-215966 filed Aug. 8, 2006, and 2007-167461 filed Jun. 26, 2007 which are hereby incorporated by reference herein in their entirety.

What is claimed is:

1. A motion vector detection apparatus comprising:
a calculation unit configured to calculate a temporal distance between a frame to be coded and each of a plurality of reference candidate frames referred to by the frame to be coded;
a motion vector detection unit configured to search for a candidate motion vector between the frame to be coded and each of the plurality of reference candidate frames by performing searching with a low level of accuracy for the reference candidate frame in which the temporal distance calculated by the calculation unit is longer than a set temporal distance, and performing searching with a high level of accuracy for the reference candidate frame in which the temporal distance is shorter than the set temporal distance, and detect a motion vector for the frame to be coded from the candidate motion vectors; and
a motion vector calculation unit configured to perform motion vector search for the reference candidate frame in which the temporal distance is shorter than the set temporal distance in the same search range as the reference candidate frame in which temporal distance is shorter than the set temporal distance, wherein
when the candidate motion vector is searched for between the frame to be coded and the reference candidate frame, an accuracy of searching performed by the motion vector detection unit is changed according to the temporal distance between the frame to be coded and the reference candidate frame calculated by the calculation unit, and a coding type of the reference candidate frame,
wherein the shorter the temporal distance between the frame to be coded and the reference candidate frame calculated by the calculation unit becomes, the higher the motion vector search accuracy, and wherein the longer the temporal distance between the frame to be coded and the reference candidate frame calculated by the calculation unit becomes, the lower the motion vector search accuracy.

2. The motion vector detection apparatus according to claim 1, further comprising a determination unit configured to determine the accuracy of searching for a candidate motion vector between the frame to be coded and the reference candidate frame, according to the temporal distance between the frame to be coded and the reference candidate frame calculated by the calculation unit, and the coding type of the reference candidate frame, wherein the motion vector detection unit searches for a candidate motion vector between the frame to be coded and each of the plurality of reference candidate frames and detects a motion vector for the frame to be coded from the candidate motion vectors according to the search accuracy determined by the determination unit.

3. The motion vector detection apparatus according to claim 2, wherein the determination unit raises the motion vector search accuracy in order of a B-slice (B-picture)-coding type<a P-slice (P-picture)-coding type<an I-slice (I-picture)-coding type of the reference candidate frame.

4. The motion vector detection apparatus according to claim 3, wherein the coding type of the reference candidate frame is either a slice type or a picture type.

5. A motion vector detection apparatus comprising:
a calculation unit configured to calculate a temporal distance between a frame to be coded and each of a plurality of reference candidate frames referred to by the frame to be coded;
an image reduction unit configured to reduce the frame to be coded and the reference candidate frames;
a determination unit configured to determine a reduction rate of the frame to be coded and reference candidate frames when the frames are reduced by the image reduction unit according to the temporal distance calculated by the calculation unit;
a motion vector calculation unit configured to perform motion vector search for the reference candidate frame in which the temporal distance is shorter than a set temporal distance in the same search range as the reference candidate frame in which temporal distance is shorter than the set temporal distance; and
a motion vector detection unit configured to search for a candidate motion vector between the frame to be coded and each of the plurality of reference candidate frames using the frames reduced by the image reduction unit, by performing searching with a low level of accuracy for the reference candidate frame in which the temporal distance calculated by the calculation unit is, longer than the set temporal distance and performing searching with a high level of accuracy for the reference candidate frame in which the temporal distance is shorter than the set temporal distance, and detect a motion vector for the frame from the candidate motion vectors,
wherein the shorter the temporal distance between the frame to be coded and the reference candidate frame calculated by the calculation unit becomes, the higher the motion vector search accuracy, and wherein the longer the temporal distance between the frame to be coded and the reference candidate frame calculated by the calculation unit becomes, the lower the motion vector search accuracy.

6. The motion vector detection apparatus according to claim 5, wherein as the temporal distance between the frame to be coded and the respective one of the plurality of reference candidate frames calculated by the calculation unit becomes shorter, the more the determination unit decreases the reduction rate for the reference candidate frame, and as the temporal distance between the frame to be coded and the respective one of the plurality of reference candidate frames calculated by the calculation unit becomes longer, the higher the determination unit raises the reduction rate for the reference candidate frame.

7. A motion vector detection apparatus comprising:
  a calculation unit configured to calculate a temporal distance between a frame to be coded and each of a plurality of reference candidate frames referred to by the frame to be coded; and
  a motion vector detection unit configured to search for a candidate motion vector between the frame to be coded and each of the reference candidate frames by performing searching with a low level of accuracy for the reference candidate frame in which the temporal distance calculated by the calculation unit is longer than a set temporal distance, and performing searching with a high level of accuracy for the reference candidate frame in which the temporal distance is shorter than the set temporal distance, and detect a motion vector for the frame to be coded from the candidate motion vectors, wherein
  when a candidate motion vector is searched for between the frame to be coded and the reference candidate frame, an accuracy of searching performed by the motion vector detection unit is changed according to the temporal distance between the frame to be coded and the reference candidate frame calculated by the calculation unit, and a peak signal-to-noise ratio value of the reference candidate frame,
  wherein the accuracy of searching is also based on a picture type of the reference candidate frame,
  wherein the shorter the temporal distance between the frame to be coded and the reference candidate frame calculated by the calculation unit becomes, the higher the motion vector search accuracy, and wherein the longer the temporal distance between the frame to be coded and the reference candidate frame calculated by the calculation unit becomes, the lower the motion vector search accuracy.

8. The motion vector detection apparatus according to claim 7, further comprising a determination unit configured to determine the accuracy of searching for a candidate motion vector between the frame to be coded and the reference candidate frame, according to the temporal distance between the frame to be coded and the reference candidate frame calculated by the calculation unit, and the peak signal-to-noise ratio value of the reference candidate frame, wherein the motion vector detection unit searches for a candidate motion vector between the frame to be coded and the reference candidate frame, according to the search accuracy determined by the determination unit.

9. The motion vector detection apparatus according to claim 8, wherein the determination unit raises the motion vector search accuracy if the peak signal-to-noise ratio value of the reference candidate frame is greater than a predetermined threshold value Th1.

10. The motion vector detection apparatus according to claim 8, wherein the determination unit lowers the motion vector search accuracy if the peak signal-to-noise ratio value of the reference candidate frame is less than a predetermined threshold value Th2.

11. The motion vector detection apparatus according to claim 8, wherein the determination unit raises the motion vector search accuracy if the peak signal-to-noise ratio value of the reference candidate frame is greater than a predetermined threshold value Th1, and lowers the motion vector search accuracy if the peak signal-to-noise ratio value of the reference candidate frame is less than a predetermined threshold value Th2 which is less than the predetermined threshold value Th1.

12. A method for detecting a motion vector comprising:
  calculating a temporal distance between a frame to be coded and each of a plurality of reference candidate frames referred to by the frame to be coded; and
  searching for a candidate motion vector between the frame to be coded and each of the plurality of reference candidate frames by performing searching with a low level of accuracy for the reference candidate frame in which the temporal distance is longer than a set temporal distance, and performing searching with a high level of accuracy for the reference candidate frame in which the temporal distance is shorter than the set temporal distance, and detecting a motion vector for the frame to be coded from the candidate motion vectors; and
  performing motion vector search for the reference candidate frame in which the temporal distance is shorter than the set temporal distance in the same search range as the reference candidate frame in which temporal distance is shorter than the set temporal distance,
  wherein when a candidate motion vector is searched for between the frame to be coded and the reference candidate frame, an accuracy of searching performed during the detection of the candidate motion vector is changed according to the calculated temporal distance between the frame to be coded and the reference candidate frame, and a coding type of the reference candidate frame,
  wherein the shorter the temporal distance between the frame to be coded and the reference candidate frame calculated becomes, the higher the motion vector search accuracy, and wherein the longer the temporal distance between the frame to be coded and the reference candidate frame calculated becomes, the lower the motion vector search accuracy.

13. A non-transitory computer-readable storage medium storing a computer-executable program for a method for detecting a motion vector that causes a computer to perform the following:
  calculating a temporal distance between a frame to be coded and each of a plurality of reference candidate frames referred to by the frame to be coded; and
  searching for a candidate motion vector between the frame to be coded and each of the plurality of reference candidate frames by performing searching with a low level of accuracy for the reference candidate frame in which the temporal distance is longer than a set temporal distance, and performing searching with a high level of accuracy for the reference candidate frame in which the temporal distance is shorter than the set temporal distance, and detecting a motion vector for the frame to be coded from the candidate motion vectors; and
  performing motion vector search for the reference candidate frame in which the temporal distance is shorter than the set temporal distance in the same search range as the reference candidate frame in which temporal distance is shorter than the set temporal distance,
  wherein when a candidate motion vector is searched for between the frame to be coded and the reference candidate frame, an accuracy of searching performed during the detection of the candidate motion vector is changed according to the calculated temporal distance between the frame to be coded and the reference candidate frame, and a coding type of the reference candidate frame,
  wherein the shorter the temporal distance between the frame to be coded and the reference candidate frame calculated becomes, the higher the motion vector search accuracy, and wherein the longer the temporal distance between the frame to be coded and the reference candidate frame calculated becomes, the lower the motion vector search accuracy.

14. A method for detecting a motion vector comprising:
calculating a temporal distance between a frame to be coded and each of a plurality of reference candidate frames referred to by the frame to be coded;
reducing the frame to be coded and the reference candidate frames;
determining a reduction rate for reducing the frame to be coded and the reference candidate frames according to the calculated temporal distance;
performing motion vector search for the reference candidate frame in which the temporal distance is shorter than a set temporal distance in the same search range as the reference candidate frame in which temporal distance is shorter than the set temporal distance, wherein
searching for a candidate motion vector between the frame to be coded and each of the plurality of reference candidate frames using the reduced frames by performing searching with a low level of accuracy for the reference candidate frame in which the temporal distance is longer than the set temporal distance, and performing searching with a high level of accuracy for the reference candidate frame in which the temporal distance is shorter than the set temporal distance, and detecting a motion vector for the frame to be coded from the candidate motion vectors,
wherein the shorter the temporal distance between the frame to be coded and the reference candidate frame calculated becomes, the higher the motion vector search accuracy, and wherein the longer the temporal distance between the frame to be coded and the reference candidate frame calculated becomes, the lower the motion vector search accuracy.

15. A non-transitory computer-readable storage medium storing a computer-executable program for a method for detecting a motion vector that causes a computer to perform the following:
calculating a temporal distance between a frame to be coded and each of a plurality of reference candidate frames referred to by the frame to be coded;
reducing the frame to be coded and the reference candidate frames;
determining a reduction rate for reducing the frame to be coded and the reference candidate frames according to the calculated temporal distance;
performing motion vector search for the reference candidate frame in which the temporal distance is shorter than a set temporal distance in the same search range as the reference candidate frame in which temporal distance is shorter than the set temporal distance, wherein
searching for a candidate motion vector between the frame to be coded and each of the plurality of reference candidate frames using the reduced frames by performing searching with a low level of accuracy for the reference candidate frame in which the temporal distance is longer than the set temporal distance, and performing searching with a high level of accuracy for the reference candidate frame in which the temporal distance is shorter than the set temporal distance, and detecting a motion vector for the frame to be coded from the candidate motion vectors,
wherein the shorter the temporal distance between the frame to be coded and the reference candidate frame calculated becomes, the higher the motion vector search accuracy, and wherein the longer the temporal distance between the frame to be coded and the reference candidate frame calculated becomes, the lower the motion vector search accuracy.

16. A method for detecting a motion vector comprising:
calculating a temporal distance between a frame to be coded and each of a plurality of reference candidate frames referred to by the frame to be coded; and
searching for a candidate motion vector between the frame to be coded and each of the plurality of reference candidate frames by performing searching with a low level of accuracy for the reference candidate frame in which the temporal distance is longer than a set temporal distance, and performing searching with a high level of accuracy for the reference candidate frame in which the temporal distance is shorter than the set temporal distance, and detecting a motion vector for the frame to be coded from the candidate motion vectors,
wherein when a candidate motion vector is searched for between the frame to be coded and the reference candidate frame, an accuracy of searching performed during the detection of a motion vector is changed according to the calculated temporal distance between the frame to be coded and the reference candidate frames, and a peak signal-to-noise ratio value of the reference candidate frame,
wherein the accuracy of searching is also based on a picture type of the reference candidate frame,
wherein the shorter the temporal distance between the frame to be coded and the reference candidate frame calculated becomes, the higher the motion vector search accuracy, and wherein the longer the temporal distance between the frame to be coded and the reference candidate frame calculated becomes, the lower the motion vector search accuracy.

17. A non-transitory computer-readable storage medium storing a computer-executable program for a method for detecting a motion vector that causes a computer to perform the following:
calculating a temporal distance between a frame to be coded and each of a plurality of reference candidate frames referred to by the frame to be coded; and
searching for a candidate motion vector between the frame to be coded and each of the plurality of reference candidate frames by performing searching with a low level of accuracy for the reference candidate frame in which the temporal distance is longer than a set temporal distance, and performing searching with a high level of accuracy for the reference candidate frame in which the temporal distance is shorter than the set temporal distance, and detecting a motion vector for the frame to be coded from the candidate motion vectors,
wherein when a candidate motion vector is searched for between the frame to be coded and the reference candidate frame, an accuracy of searching performed during the detection of a motion vector is changed according to the calculated temporal distance between the frame to be coded and the reference candidate frames, and a peak signal-to-noise ratio value of the reference candidate frame,
wherein the accuracy of searching is also based on a picture type of the reference candidate frame,
wherein the shorter the temporal distance between the frame to be coded and the reference candidate frame calculated becomes, the higher the motion vector search accuracy, and wherein the longer the temporal distance between the frame to be coded and the reference candidate frame calculated becomes, the lower the motion vector search accuracy.

* * * * *